(12) United States Patent
Schoenfelder et al.

(10) Patent No.: US 10,163,285 B2
(45) Date of Patent: *Dec. 25, 2018

(54) METHODS AND SYSTEMS FOR ACCESS CONTROL AND AWARENESS MANAGEMENT

(71) Applicant: Latchable, Inc., Sterling, VA (US)

(72) Inventors: Luke Andrew Schoenfelder, Willow Street, PA (US); Michael Brian Jones, Pittsburgh, PA (US); Ali Akbar Hussain, Plymouth, MN (US); James Griszbacher, New York, NY (US); Ivan Almaral Sole, New York, NY (US); Timothy H. Hearn, Cherry Hill, NJ (US)

(73) Assignee: Latchable, Inc., Sterling, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,710

(22) Filed: May 22, 2017

(65) Prior Publication Data
US 2018/0232976 A1 Aug. 16, 2018

Related U.S. Application Data

(63) Continuation of application No. 15/257,750, filed on Sep. 6, 2016, now Pat. No. 9,666,000, which is a (Continued)

(51) Int. Cl.
*G07C 9/00* (2006.01)
*H04L 29/06* (2006.01)
*H04W 12/06* (2009.01)
*H04W 84/18* (2009.01)
*H04W 4/80* (2018.01)

(52) U.S. Cl.
CPC ...... *G07C 9/00111* (2013.01); *G07C 9/00039* (2013.01); *G07C 9/00087* (2013.01); *G07C 9/00309* (2013.01); *H04L 63/08* (2013.01); *H04W 12/06* (2013.01); *G07C 9/00563* (2013.01); *G07C 9/00571* (2013.01); *G07C 2009/00412* (2013.01); *G07C 2009/00865* (2013.01); *H04W 4/80* (2018.02); *H04W 84/18* (2013.01)

(58) Field of Classification Search
CPC ...... G07C 9/00309; G07C 2009/00793; G07C 9/00571; G07C 9/00111; G07C 9/00103; G07C 2209/63; G07C 9/00904
USPC ...................................................... 340/5.61
See application file for complete search history.

(56) References Cited

U.S. PATENT DOCUMENTS 8,358,197 B2 * 1/2013 Tran .................. G07C 9/00309
340/5.26
9,437,063 B2 * 9/2016 Schoenfelder ..... G07C 9/00309
(Continued)

*Primary Examiner* — Mark Blouin
(74) *Attorney, Agent, or Firm* — Wilmer Cutler Pickering Hale and Dorr LLP

(57) ABSTRACT

Systems and methods for access control management designed for multi-unit buildings are provided. The disclosed systems can use mobile devices, a local mesh network, access control devices, and wireless communication to facilitate multi-unit real estate management. Mobile devices can download and use credentials to access appropriate areas and units in a building through local wireless communications with access control devices.

36 Claims, 23 Drawing Sheets

Related U.S. Application Data continuation-in-part of application No. 14/589,805, filed on Jan. 5, 2015, now Pat. No. 9,437,063.

(60) Provisional application No. 61/923,643, filed on Jan. 4, 2014.

(56) References Cited

U.S. PATENT DOCUMENTS 9,666,000 B1 * 5/2017 Schoenfelder ...... G07C 9/00111
2007/0146118 A1   6/2007 Rodriguez et al.

* cited by examiner

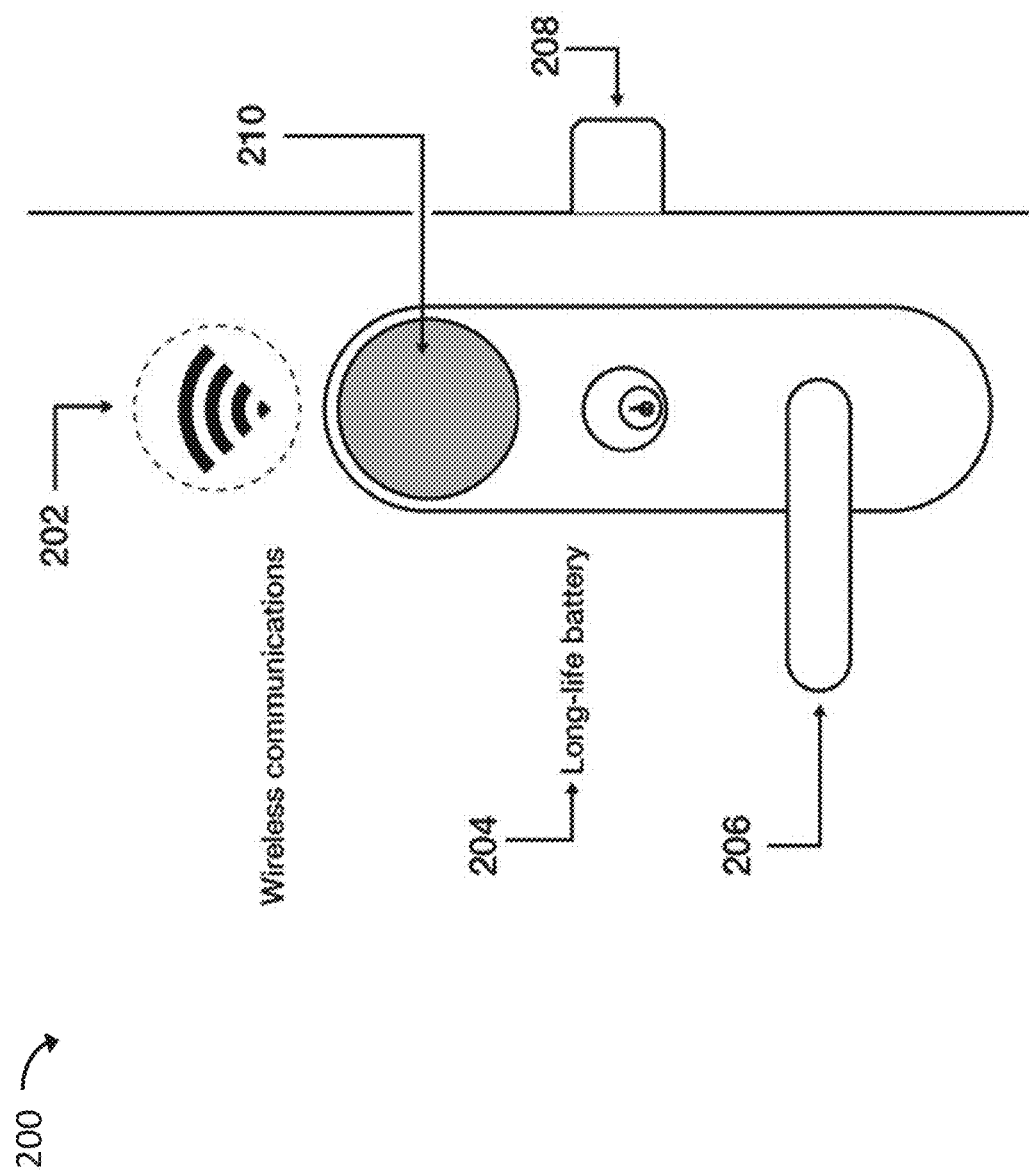

METHODS AND SYSTEMS FOR ACCESS CONTROL AND AWARENESS MANAGEMENT

CROSS-REFERENCE TO RELATED APPLICATIONS

This application is a continuation of and claims the benefit under 35 U.S.C. § 120 of U.S. patent application Ser. No. 15/257,750 filed on Sep. 6, 2016, which is a continuation-in-part of and claims the benefit under 35 U.S.C. § 120 of U.S. patent application Ser. No. 14/589,805, filed on Jan. 5, 2015, now U.S. Pat. No. 9,437,063, entitled "METHODS AND SYSTEMS FOR MULTI-UNIT REAL ESTATE MANAGEMENT," which claims the benefit under 35 U.S.C. § 119(e) to U.S. Provisional Application No. 61/923,643, entitled "A SYSTEM OF MULTI-UNIT REAL ESTATE MANAGEMENT," filed on Jan. 4, 2014, the contents of the applications are incorporated by reference herein in their entirety.

TECHNICAL FIELD

The present invention relates to systems and methods for access control management designed for multi-unit buildings.

BACKGROUND

An ongoing need exists to manage access for parties involved in the occupation and operation of multi-unit buildings. Access management can have significant implications, for example, on overall security, legal liability, and personal comfort. Security of multi-unit buildings is an important and complicated issue, specifically the management of keys that can grant access to building units and common spaces. Each individual unit in the building can have different access control requirements and occupants or other individuals related to operations and maintenance of these buildings may periodically need to access different facilities within a building to perform particular functions, for example, package delivery or cleaning.

Over time, a variety of systems have emerged to help manage these types of environments. Prior art physical key management systems, while effective when operated properly, can be costly and unwieldy for the majority of users. For example, the installation cost can be high, as well as the cost and time associated with training employees on the system. In addition, high ongoing costs associated with maintenance and poor adherence to the system policies can render those systems ineffective.

Other prior art systems provide digital access control management through radio frequency identification (RFID) or other types of magnetic or electronic keys that are centrally controlled by a management interface. Such prior art systems allow door control and management to take place from a central server, while users can authenticate and get access through the use of "numeric keypads" and "card readers" on-site. These systems require locally-deployed management hardware, which creates security risks. For example, numeric keypads often become insecure when numeric codes are shared between authorized and non-authorized parties as a form of convenience.

Using biometric identifiers for authentication purposes is an alternative to access control PIN codes or badges. However, the use of biometric locks can be hard to administer in a multi-unit context. For example, it can be complicated to collect biometric data, such as, fingerprints, and store and program them into the access control system. Moreover, because of the extra security requirements associated with storage of sensitive biometric data, the storage of biometric data can be cost-prohibitive for typical building owners. In addition, users may become uncomfortable when they are required to provide biometric data for authentication and storage.

Other prior art systems utilize mobile phones or other mobile devices as physical identifiers for single-owner buildings or single units. These systems allow a user's mobile phone to serve as an authenticating identifier when interacting with access control systems through either a network connection or a locally transmitted radio frequency connection. The systems that utilize mobile devices often require a persistent internet connection to operate, which may be suitable for single-owner buildings. However, this can become rather problematic for multi-unit buildings.

Bluetooth is another communication standard employed in some prior art systems to provide tracking suitable for following users inside a defined space using a Bluetooth-enabled device. However, in those systems, Bluetooth communication is merely used to track a user to create a timeline of activity for the user through silent and imperceptible handshakes between a user's device and hardware installed within a geographic area. Other prior art systems utilize Bluetooth technology to distribute and manage keys, however they require that access control points be centrally updated with new information to update new keys and users being added to the system. Finally, other Bluetooth-enabled prior art systems use rotating authentication credentials that don't require updates from a central server; however, they have security risks.

Accordingly, there is a need for a secure access management system for multi-unit buildings that can control the interactions between occupants, guests, service providers, and building owners that is not provided by existing prior art systems.

SUMMARY

Systems and methods for secure access control management are provided that include access control points, mobile devices, a local mesh network, and a unified credential system.

According to aspects of the invention, an exemplary access control management system can include a plurality of access control devices, each comprising a wireless transceiver and a wireless transmitter. Each access control device can communicate with a mobile device when the mobile device is in range of the access control device and control a locking mechanism, in response to wireless signals received from the mobile device. The access control devices and mobile devices in range of any access control device in the system can form a local mesh network. In the local mesh network, the access control devices can communicate with mobile devices and with other access control devices in the system. The mobile devices can store credentials that can control access to one or more access control devices and can unlock the locking mechanisms controlled by the one or more access control devices. According to aspects of the invention, mobile devices of other approved users can receive credentials to their mobile devices that can also grant permission to unlock the locking mechanisms controlled by the one or more access control devices. The mobile devices can also store a system update and can be configured to transmit the system update to access control devices in range through wireless signals. The access control devices can transmit the received system update to other access control devices in range through the local mesh network.

According to alternative embodiments of the invention, an exemplary method for access control management can include providing a plurality of access control devices, each comprising a wireless transceiver and a wireless transmitter, each capable of communicating with a mobile device when the mobile device is in range of the access control device and controlling a locking mechanism, in response to wireless signals received from the mobile device. The method can also include forming a local mesh network by coupling access control devices in range of each other and mobile devices in range of any access control device in the system. The method can also include storing, by the mobile device, credentials that can control access to one or more access control devices and unlock the locking mechanisms controlled by the one or more access control devices, in response to wireless signals transmitted by the mobile device. The method can also include providing credentials to mobile devices of other approved users that are given permission to unlock the locking mechanisms controlled by the one or more access control devices. The method can also include storing, by the mobile device, a system update and transmitting the system update to access control devices in range of the mobile device through wireless signals. The method can also include transmitting, by the access control device, the received system update to other access control devices in range through the local mesh network.

According to alternative embodiments of the invention, a mobile device for providing access control management can be configured to communicate with a plurality of access control devices, each comprising a wireless transceiver and a wireless transmitter, when the mobile device is in range of the access control device. The mobile device can also be configured to control a locking mechanism in one or more access control devices in range through wireless signals sent from the mobile device. The mobile device can also be configured to enter a local mesh network of access control devices in range of each other and in range of other mobile devices. The mobile device can also be configured to store credentials that can control access to one or more access control devices and unlock the locking mechanisms controlled by the one or more access control devices. The mobile device can also be configured to provide credentials to mobile devices of other approved users that are given permission to unlock the locking mechanisms controlled by the one or more access control devices. The mobile device can also be configured to store a system update and transmit the system update to access control devices in range of the mobile device through wireless signals.

BRIEF DESCRIPTION OF FIGURES

FIG. 2 illustrates an exemplary access control device, according to embodiments of the present invention.

DETAILED DESCRIPTION

According to embodiments of the present invention, methods and systems for access control management designed for multi-unit buildings are provided. An exemplary system can use mobile devices, a local mesh network, installed access control hardware, communication standards, and a credentialing layer to displace physical key management systems. In addition, the disclosed systems can eliminate the need for physical key or access cards, and rekeying requirements faced by many operators in the multi-unit real estate management industry.

Figure 1A:
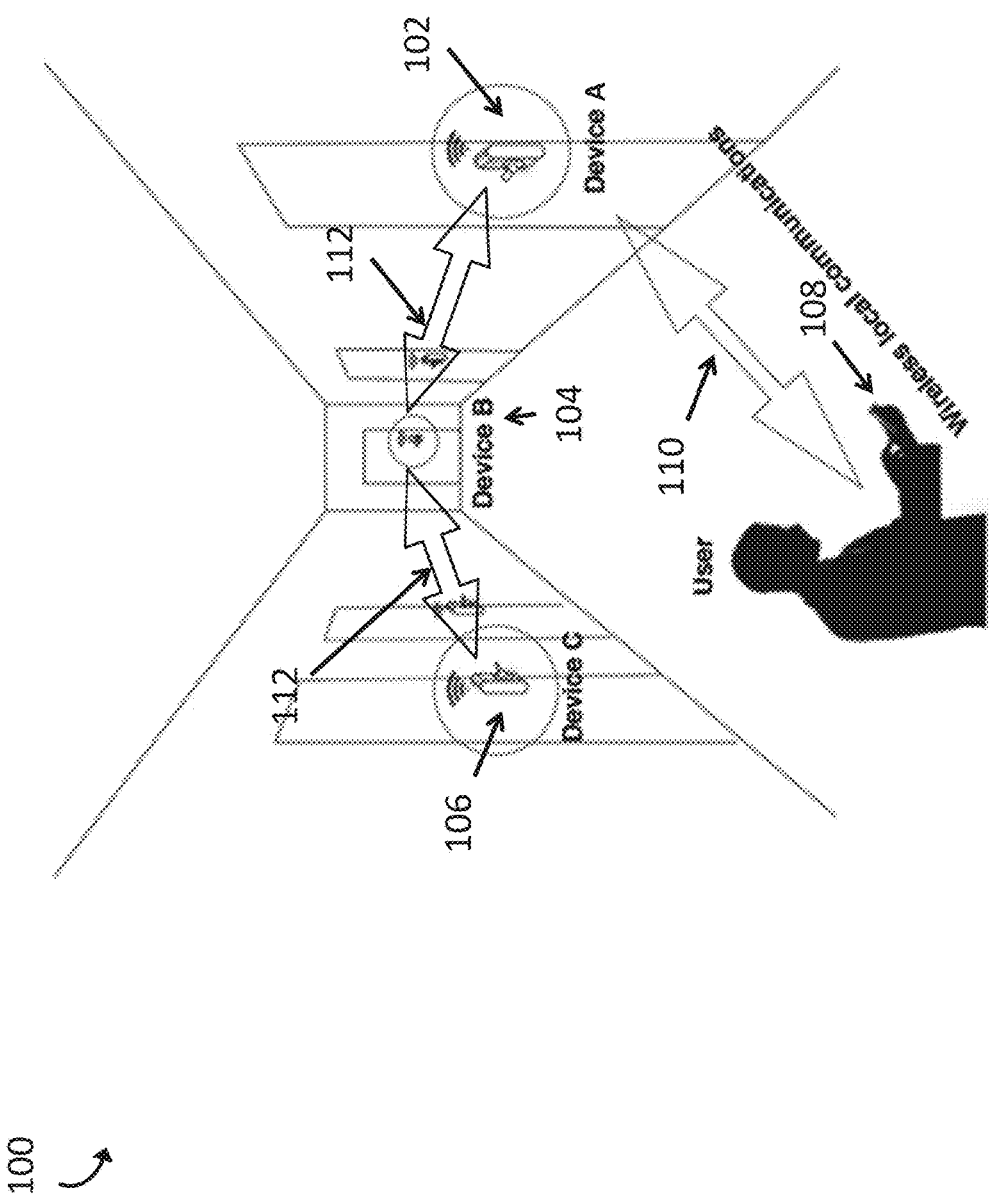
FIG. 1A illustrates an exemplary access control management system, according to embodiments of the present invention.

FIG. 1A illustrates an exemplary access control management system. Specifically, system 100 can include one or more access control devices (102, 104, and 106), at least one mobile device 108 that is configured to communicate with the access control devices through wireless communication protocol 110, and a local mesh network constructed by the access control devices (102, 104, and 106) and the mobile device 108. Access control devices can communicate with other access control devices in range, for example, through wireless communication protocol 112, which can be the same of the same type as wireless communication protocol 110. Persons of ordinary skill would understand that the local mesh network can be a dynamic network with mobile devices becoming part of the network as they get within range of access control devices and leaving the network as they go out of range from all access control devices in the network. The access control devices (102, 104, and 106) can be of-the-shelf, customized, or retro-fitted hardware devices, e.g., wireless sensors added to existing hardware or bolt on attachments for existing mechanical locks, that can be installed in various access points in a multi-unit building, including but not limited to the building entrance door, auxiliary entrance doors, auxiliary service doors, common room area doors, exercise room doors, individual unit doors, doors within units, and other relevant entrance points. Mobile device 108 can include smartphones, tablets, phablets, or other customized wireless communication-enabled devices that can communicate with access control devices (102, 104, and 106) through a wireless local communication protocol 110, such as Bluetooth, Z-Wave, ZigBee, Thread, or other radio frequency (RF) communication network. Mobile device 108 can also store user credentials that can be paired to user mobile device 108.

According to embodiments of the invention, the local mesh network can connect the access control devices with the mobile devices to activate various functions as described in detail below. According to aspects of the invention, a credential can be a digital file of lines of encrypted code. The credential can provide authentication and grant access to the user when it is paired with the user mobile device. For example, access control device 102 can grant access to a unit that can be owned or rented by a tenant that carries mobile device 108 and stores the appropriate credential. When the user approaches their unit, access control device 102 and user mobile device 108 can wirelessly communicate to grant the user access, e.g., unlock the door, to the unit. Moreover, a single credential can grant the user access to all buildings and establishments that implement the disclosed system. For example, the user can use the credential stored in their mobile device to access their office, their gym, their private club, or any area that has installed access control devices that can control access to secure areas. The user can conveniently manage all of their access, guest and service provider provisioning through the same interface, e.g., an app running on their mobile phone or a website.

Figure 1B:
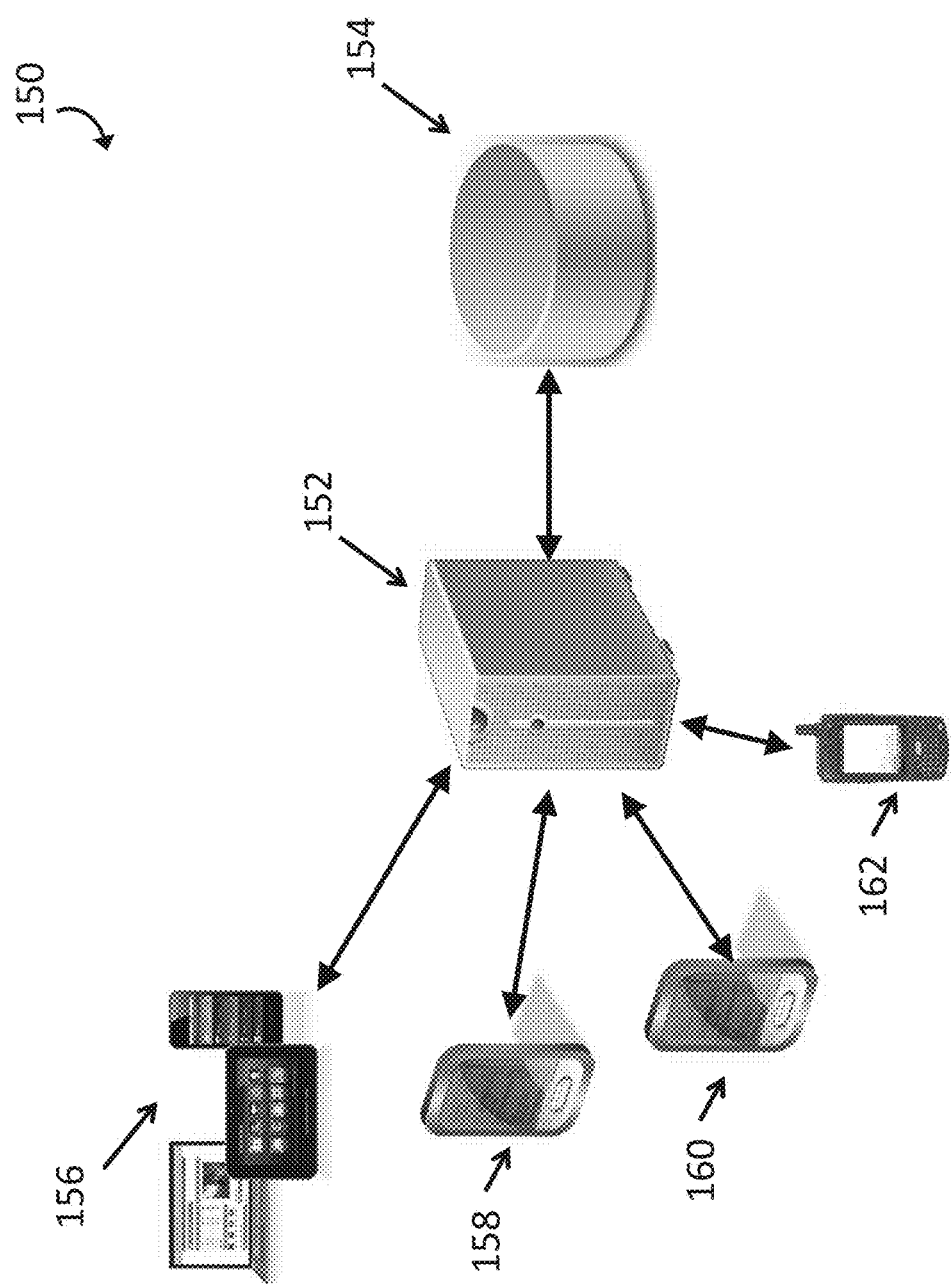
FIG. 1B illustrates an exemplary system architecture for an access control management system, according to embodiments of the present invention.

According to aspects of the invention, an exemplary system architecture is illustrated in FIG. 1B. FIG. 1B shows server 152 in communication with database 154, and also in communication with building manager device 156, user mobile device 158, guest mobile device 160, and service provider device 162. Server 152 can generate and manage credentials that can be stored in database 154. A building manager using device 156, for example, a computer, tablet, or cell phone, can request from server 152 to generate a credential for a user, for example, a new building tenant, according to access provisions specific for the user. The building manager can specify the access provisions, e.g., granting access to user unit, granting access to building gym, etc., for the particular user when requesting the credential generation. The building manager can modify the access provisions at any time, for example, when the user gym membership has expired, the building manager can request from server 152 a new credential for the user through an interface running on building manager device 156. The user can receive from server 152 and can store the credential in mobile device 158. Server can allow different permissions to users, according to provisions specified by the building manager. For example, the server can enable the user to grant to their guests access to their building. A user can request using an application running on mobile device 158 from server 152 to generate a credential for their guest with mobile device 160. For example, the user can send to the guest an invitation to an event taking place in their building using the access control management app. According to aspects of the invention, the credential can be requested automatically Once server 152 generates the credential, it can send it to guest mobile device 160. The guest mobile device 160 and the generated credential will be paired and, can provide authentication of the guest. Then the guest can access the building and unit using their mobile device 160. For example, the server can enable the user to grant to their guests access to their building. The user can also request using the application running on mobile device 158 from server 152 to generate a credential for a service provider with mobile device 162. The service provider mobile device 162 and the generated credential will be paired and, can provide authentication of the service provider.

Persons of ordinary skill would understand that the disclosed systems and methods are enabled by the use of mobile devices and more specifically by the particular characteristics of mobile devices and how people interact with their mobile devices. For example, people carry a mobile device with them all the time. Mobile devices are most of the time turned on and can passively communicate with sensors in their environment without requiring the user's active engagement. Moreover, mobile devices have a wide variety of radio frequency communication capabilities, through built-in hardware, that make them ideal for communicating through different types of communication standards. Mobile devices can install and run applications or apps that enable functionality not available through a web browser operating on a computer, for example, by utilizing the device unique hardware attributes, such as radios, cameras, and secure biometric identifying sensors. In addition, mobile devices can be automatically updated in the background to provide updated secure keys, instructions, and permissions without requiring active user engagement.

According to embodiments of the invention, the local mesh network obviates the need for a persistent internet connection. As discussed above, other prior art approaches require that access control devices are always connected to the internet. In contrast, the disclosed system can link access control devices with mobile devices through a local mesh network. The mobile devices can provide a bridge to the internet for the entire mesh network. This allows operation of the access control system at low cost and with minimal power requirements, compared, for example, to a system that requires a persistent internet connection to operate and update the access control devices. In the described system, the access control devices can be connected to each other and the system can utilize the handshakes performed between user devices and access control devices to pass any system updates to the access control devices. User devices typically have internet connections and sufficient capacity to passively pass system update packets through the required handshake procedures with the installed access control hardware. Therefore, there is no additional requirement for a persistent internet connection installation just for the access control devices.

An exemplary access control device is illustrated in FIG. 2. Specifically, access control device 200 can include a wireless communications module 202 configured to communicate with user mobile devices and other access control devices in its proximity, through a wireless transmitter and a wireless receiver. The communication from the user device can relate to granting the user of the mobile device access to a particular area or unit. In addition, the communication from the user device and other access control devices can also relate to system updates. Access control device 200 can also include a long-life battery 204 and a handle 206 to move latch 208 and unlock the door's passage lock, deadbolt, or other locking mechanisms, for example, to a user's unit. Access control device 200 can also include a digital display 210 to provide the user with information. Persons of skill in the art would understand that the access control device of FIG. 2 is for illustration purposes only and that other types of access control devices can be used.

According to aspects of the invention, each access control device can have a unique identification (ID) that can identify them in the system. For example, the access control IDs can be based on the MAC address of the access control device radio. Server 152 can maintain a table of cryptographic keys that can be indexed by the access control device ID. Each credential associated with an access control device ID can be configured during installation into the appropriate lock. When access to a lock is requested, the appropriate credential is transmitted securely to an application running on a mobile device, for example, using a secure transport such as SSL/TLS and can be stored in the mobile device. The credential can be used to generate an authenticated unlock request, for example using an unlock protocol. When a user requests credentials from the server, for example, for a guest or a service provider, the server can determine the appropriate credential to send to the guest or service provider. The server determines the appropriate credential based on the authenticated user who is requesting them. For example, the user can be authenticated in the system through user account authentication, e.g., by providing user details when setting up an account with the system.

According to embodiments of the invention, the disclosed access control device can have pre-installed keys, e.g., authentication information. These pre-installed keys can be pre-installed at the access control device from the factory, can be stored at the access control device during installation, or can be periodically or sporadically updated. These keys can also be mirrored in a server, that can generate credentials for a user or a guest. This can enable the use of the access control system, even when the access control device is intermittently connected or not connected to the internet or a local area network. The mirrored keys on the server can generate the appropriate credentials that can grant access to an area that is controlled by the access control device, based on the stored keys in the access control device.

According to embodiments of the invention, the systems and methods described herein negate the need for physical key management. For example, the system enables building managers to create account holders within a given multi-unit building, irrespective of physical key issuance. Once a user-tenant has an account, they are responsible for managing their own keys, whether that takes the form of a mobile device or a supplied third party piece of radio frequency capable hardware. Accordingly, building managers may no longer be burdened, for example, with guest access management, because the disclosed system can make user-tenants accountable for all aspects of guest access management.

Figure 3:
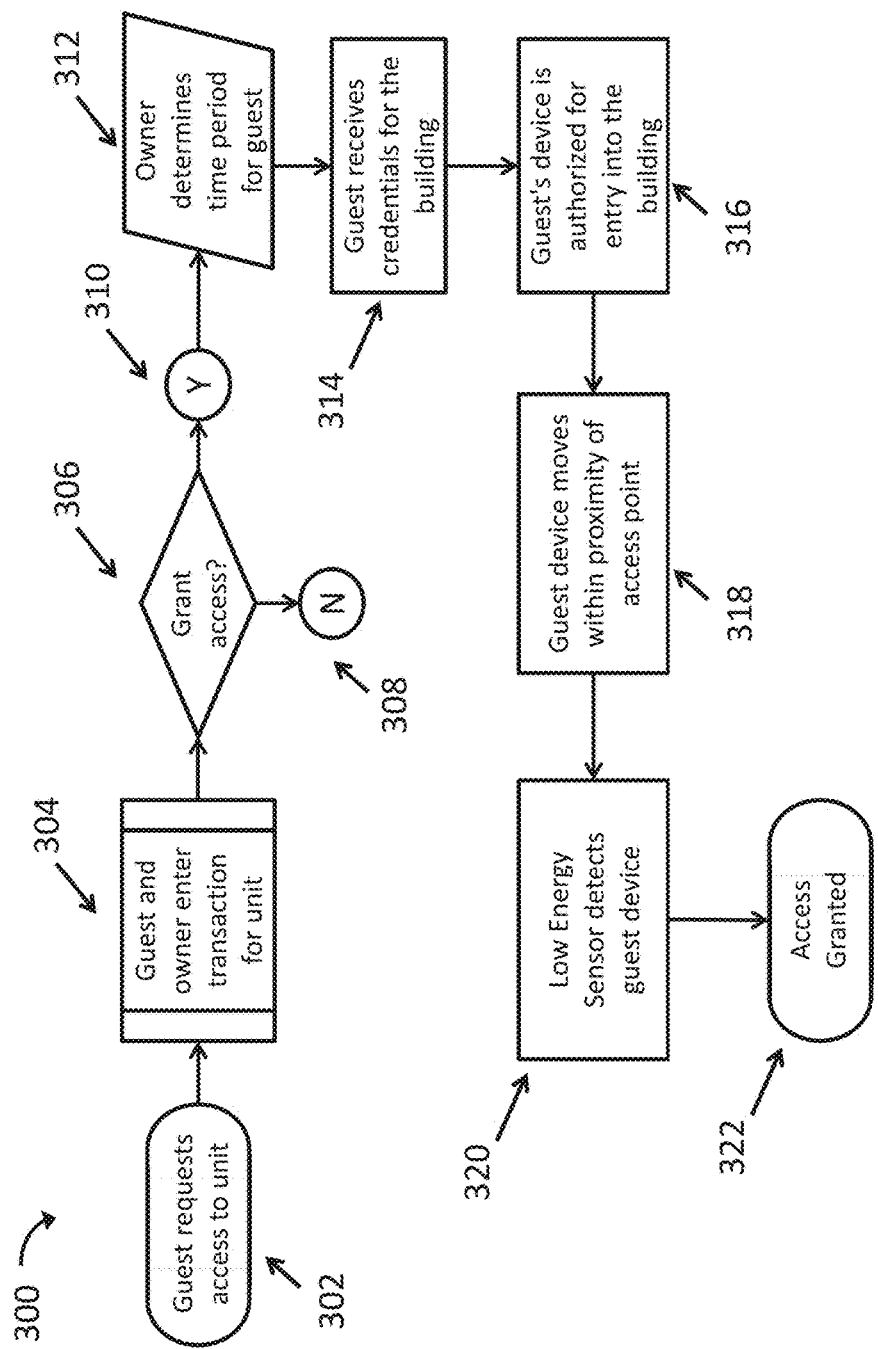
FIG. 3 illustrates an exemplary method for providing guest access to a multi-unit building, according to embodiments of the present invention.

This is illustrated in FIG. 3, generally at 300. When a guest of a unit owner/tenant in a multi-unit building arrives at the building, he can request access to the unit (step 302). The guest and the owner then can enter a transaction (step 304), for example, through a mobile device application or app. As an illustrative example, the request for access from the guest can appear as a notification from an app running on a user mobile device. The owner can then determine whether to grant access to the guest or not (steps 308 and 310). If the owner decides to grant access to the guest, the owner can optionally specify a time period during which the guest will have access to the unit (step 312). Then the guest receives the necessary credentials for the building (step 314), which would authorize a guest's mobile device to provide access to the building and all necessary access points until the user unit (step 316). When the guest mobile device moves within proximity of the access control point of the user unit (step 318), the access control point sensor can detect the guest device (step 320), which would allow the guest access to the unit (step 322). Since the user can receive the notification and grant access to a guest through an application running on a mobile device, the user can grant access to the guest from anywhere without being necessary for the user to be present in the unit. Persons of ordinary skill would understand that guests can be granted access by the tenant even before they arrive at the building and that access can by automatically granted, for example, in the case of an authorized delivery or repair.

In addition to providing access to a unit, users can provision access credentials to their guests with appropriate restrictions, allowing them to delineate which facilities the guest can access across the entire building, with time limitations, and other restrictive characteristics. This can enhance the user experience for both those occupying the building and those visiting the building, creating value for the building manager.

According to embodiments of the invention, the system can be viewed and administered through a specialized and secure portal to a server on any number of devices, including computers, mobile devices, and other interfaces. For example, building managers and users with appropriate privileges can provide, remove, or modify privileges and access to guests and service providers through a webpage or application that is securely connected to the server.

As discussed above, some PIN-based prior art systems face security challenges because numeric codes can be easily shared between authorized and non-authorized parties. While it is still possible that a user would share their mobile device with a guest for purposes of authenticating, the indispensable and multiple-use nature of the mobile devices would provide a limiting element to this type of behavior. Security is important to both operators and users in a multi-unit building and the system described herein allows for a wide variety of security levels to be implemented that can further enhance the security beyond the advantages conveyed by simply using a user's mobile device for authentication. These security elements range from a single level authentication (the presence of the user's mobile device) to a three-level authentication activated through the presence of the user's mobile device, the use of a remembered password (possibly entered on the user's mobile device), and biometric scanning (possibly provided through the user's mobile device). This flexible security capacity can be activated on a building wide basis by the manager or by an individual user when setting their own preferences and preferences for their guests.

Figure 4:
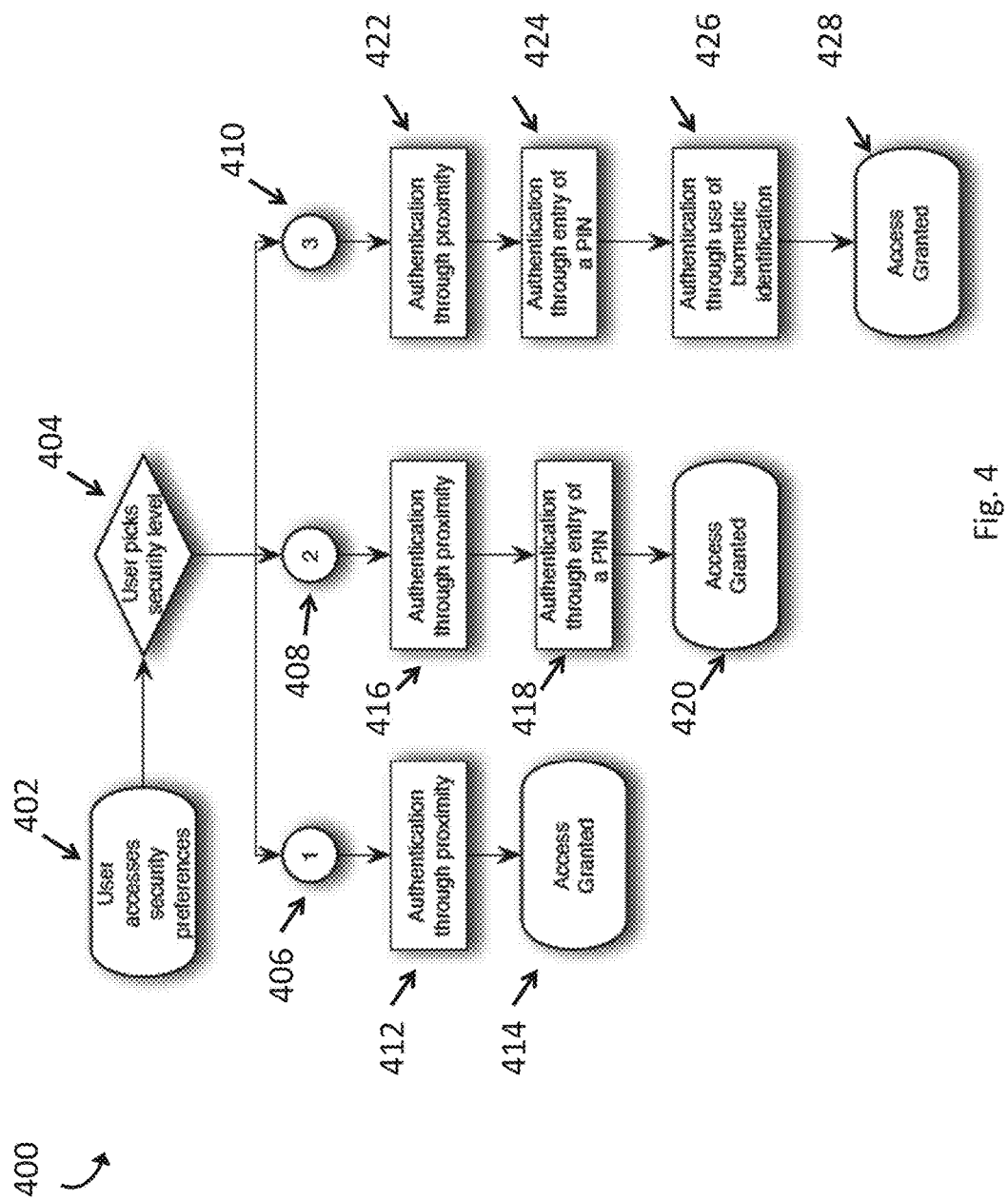
FIG. 4 illustrates an exemplary method for setting security levels for access control management, according to embodiments of the present invention.

FIG. 4 illustrates this tiered authentication system. Specifically, FIG. 4 shows an exemplary method 400 for setting security levels for access control management. A user can access security preferences, for example, through an app running on a mobile device or a webpage (step 402). The user can then select the security level for particular guests or service providers (step 404). As described above, the user can select a single level authentication 406, which can require authentication only through proximity 412. For example, a guest with a mobile device that has received the proper credentials can be granted access to the unit (414), when the mobile device and the access control device are within an appropriate distance.

Alternatively, the user can select a two-level authentication 408, which can require authentication through proximity 416 and through entry of a PIN 418. For example, a guest with a mobile device that has received the proper credentials can be granted access to the unit (420) when the mobile device and the access control device are within an appropriate distance and after the guest enters the PIN, for example, in a prompt on the mobile device. The PIN can be provided to the guest by the user. According to aspects of the invention, users can set individual pins for each guest, such that a particular guest mobile device is paired with a unique PIN for increased security. Access control device 200 can also include a digital display 210 to provide the user with information and an input method to communicate with the device.

Finally, the user can select a three-level authentication 410, which can require authentication through proximity 422, through entry of a PIN 424, and through the use of biometric identification. For example, a guest with a mobile device that has received the proper credentials can be granted access to the unit (428) when the mobile device and the access control device are within an appropriate distance, after the guest enters the PIN, for example, in a prompt on the mobile device, and after the guest identifies himself through the use of biometric identification, for example, on the mobile device.

According to embodiments of the invention, access credentials can easily be extended to service personnel to perform routine functions when the user is away. Large waiting windows typically provided by service providers, for example, cable company technicians, have been a major source of user frustration. The disclosed systems can reduce the time burden placed on the consumers of these services. A user can request service from a particular service provider, receive an approximate time window for that service to be performed, and accordingly provision access for that period without the need for the user to remain in their unit. This can be valuable to a wide variety of service providers, for example, housekeeping service providers, grocery delivery services, and other sensitive package delivery services. All of these service providers would ideally have access to the secured area assigned to a particular user for purposes of performing their service function, and the disclosed system can dramatically increase the ease with which they could perform their service.

According to embodiments of the invention, the system can incorporate an application programming interface (API) suitable for auto-provisioning access in accordance with relevant purchases. For example, when a user can order groceries from Amazon.com, the API can automatically provide access to their building, their apartment, and even appropriate rooms at check out to facilitate the delivery of their perishable groceries directly to their cold storage as part of the checkout process. The API can also have significant application within the hospitality management industry, with users being able to secure access to their rented rooms, for example, via AirBNB or similar services, and hotel rooms at checkout, eliminating the present hassle associated with key procurement and exchange between renter and owner. The disclosed system can also provide real time updates to all concerned parties regarding the behavior of all guests during their time on the building premises.

Figure 5:
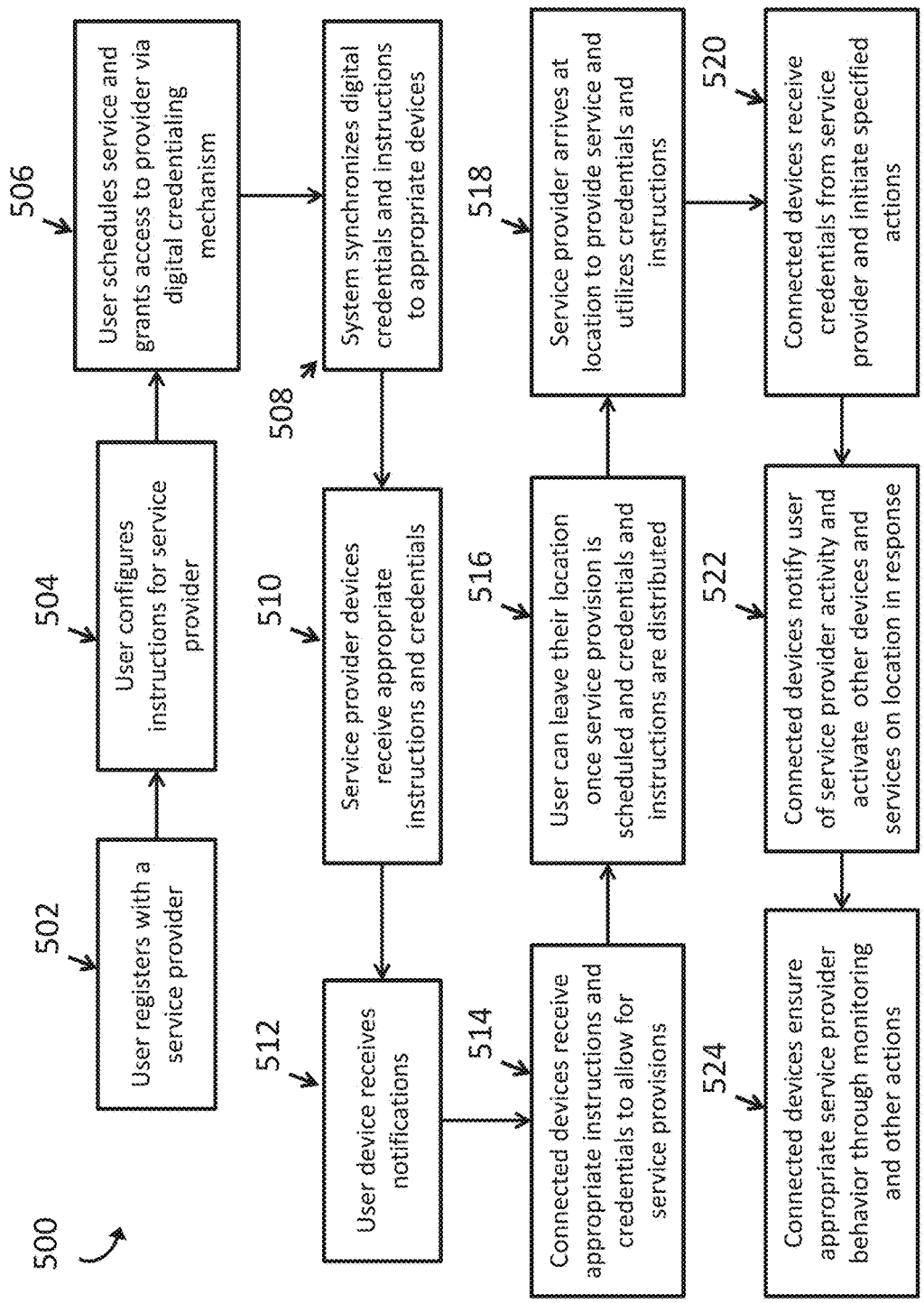
FIG. 5 illustrates an exemplary method for providing access to a multi-unit building, according to embodiments of the present invention.

Based on the discussion above, an exemplary method 500 for providing access to a multi-unit building is illustrated in FIG. 5. Specifically, a user can register with a service provider (step 502), for example, through a service access provider website for a service to be performed, such as cable service installation. In addition, the user can configure particular instructions for the service provider (step 504). The user can register delivery or other instructions in either a proprietary application with the service provider directly, or via an API relationship between the disclosed system and the service provider. Then, the user can schedule the service and can grant access to the provider via a digital credentialing mechanism, according to the scheduled time (step 506). For example, the user can use an application running on a mobile device to decide what type of credentials to provide and to set the appropriate restrictions around these credentials. Types of available credentials can include a Bluetooth based credential, a digital copy of a physical key (KeyMe), an alphanumeric password, or even a pre-programmed digital radio frequency credential.

The disclosed system then can synchronize the digital credentials and instructions to appropriate service provider mobile devices (step 508). Subsequently, the service provider mobile devices can receive appropriate instructions and credentials that will provide access to the user unit (step 510). For example, the service provider can receive a password over the phone, a digital credential downloaded to a proprietary piece of hardware, e.g., a UPS handheld device, a digital credential downloaded to a service provided smartphone, a text message, or an email with instructions.

The user devices can optionally receive notifications, such as push notifications, emails, texts, or calls, informing them that the appropriate credentials for the service provider have been received by the service provider devices (step 512). In addition, other appropriate connected devices, for example, access control devices for the building entrance and the user unit, can also receive the appropriate instructions and credentials to allow for the service provisions (step 514). The credentials can be matched through a set of pre-programmed parameters on a connected device or via a message from a network.

As discussed above, the user's presence in the unit is not required, therefore the user can leave their location once service provision is scheduled and credentials and instructions have been distributed (step 516). The service provider can arrive at the location to provide service and can utilize the credentials and instructions for getting access into the user unit (step 518). Once the service provider devices and the access control devices are within an appropriate distance, the credentials from the service provider devices can grant access to the service provider, according to the actions specified by the user (step 520). For example, the access control devices can perform functions like unlocking, locking, turning off a thermostat, turning on a video recording system, or activating additional sensors. The access control devices can also notify the user of the service provider activity and activate other devices and services on location in response to that activity (step 522). According to embodiments of the invention, the access control devices can further ensure appropriate service provider behavior, for example, through monitoring (step 524). Abnormal or suspicious behavior can be reported to the user, law enforcement, or other service providers as appropriate.

The disclosed systems and methods can provide unique advantages to operators of multi-unit buildings, for example, tenant activity tracking around various amenities, entrance tracking for insurance and security purposes, access management for service and delivery personnel, behavior-tracking that may help assist operators in retaining or acquiring new tenants, secure communications and local services in instances of natural disaster.

Specifically, the disclosed systems can provide a real-time view to building management of all guests expected to visit and all guests currently visiting through individual users' guest logs and instructions. This can be especially important in multi-unit buildings, whereby the disclosed system can track which doors the user and the user's guests have accessed and which path they have taken within the building for the purposes of providing the highest degree of security to the user and other guests on premises.

As discussed above, the access control devices can have nearly permanent access to internet connectivity through the handshakes with the user mobile devices. This can eliminate the need for the system to have a dedicated internet connection and creates a system of connectivity that can be insulated from service outages. The users' devices in the system will likely be provided through a host of different service providers, therefore creating redundancy in case one service provider fails to provide access at any given moment.

Even though the system can have nearly permanent access to the internet, the disclosed systems and methods can robustly manage access even during prolonged periods of no internet connectivity. For example, keys or mobile devices can be provisioned and sent to guests or service providers without the need to update or notify the access control devices. If for some reason the system does not access a network connection between the time of key provision and guest arrival, the guest's mobile device can actually supply the update packet to the access control device and the network when utilizing their key on-site.

Figure 6:
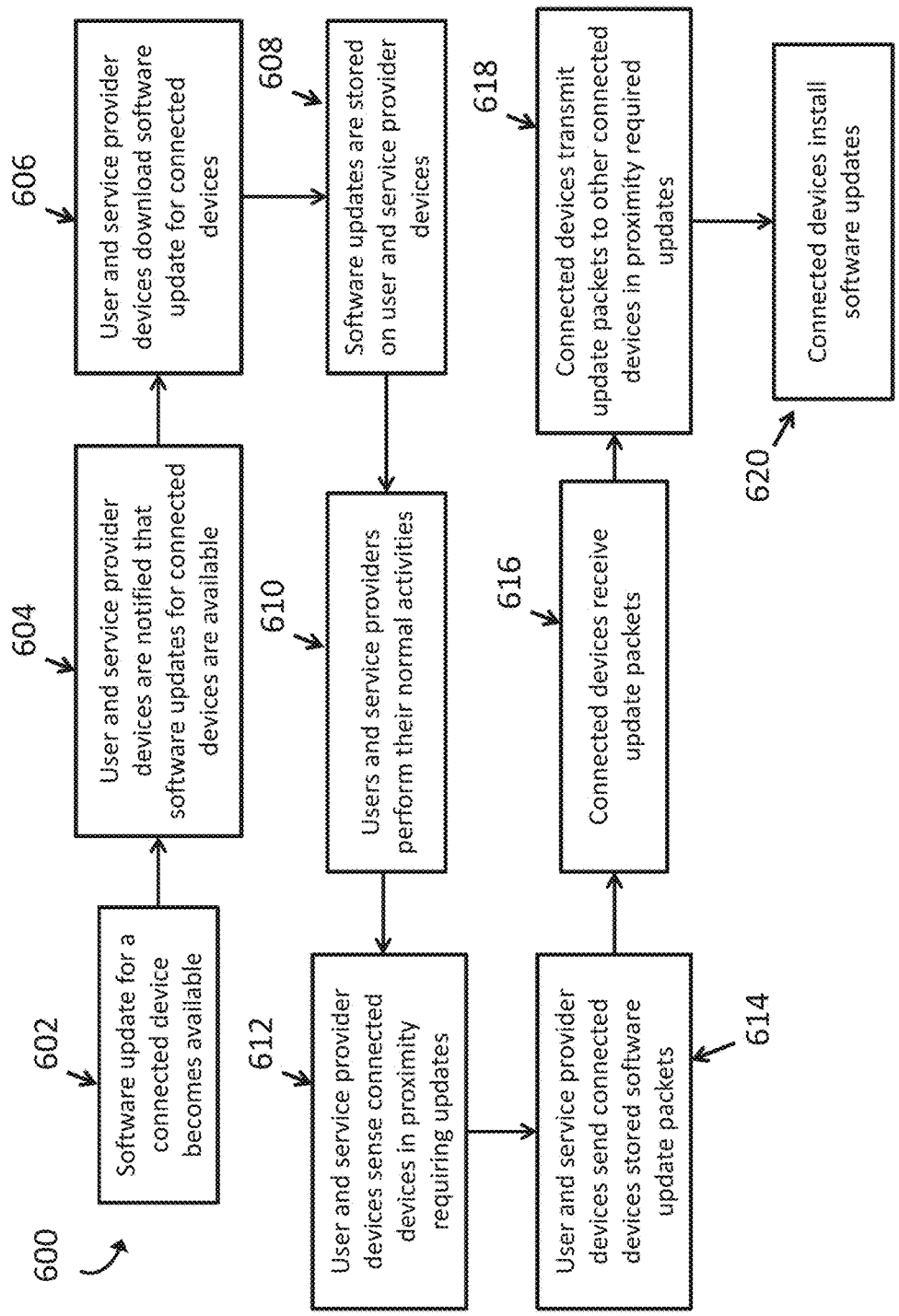
FIG. 6 illustrates an exemplary method for updating components of an access control management system, according to embodiments of the present invention.

An exemplary method 600 for updating components of an access control management system is illustrated in FIG. 6. Periodically, the system can make available software updates for connected devices, for example, access control devices (step 602), when these devices require or would benefit from a software update to improve or enhance their functionality. After a software update becomes available, when user, guest, or service provider mobile devices are connected to the internet, they can be notified of the software updates by the system (step 604). The mobile devices can download the software update for the connected devices (step 606) and can store the update in their memory (step 608). The downloading and storing process can happen on the background and users and service providers can perform their normal activities (step 610) without requiring any special user action to update the devices. When the mobile devices are within an appropriate distance from an access control device, they can determine whether the particular access control device requires a software update (step 612). In that case, the mobile devices can send the stored software update to the access control device (step 614) and the access control device can receive the update (step 616). Once the access control device receives the update, it can transmit the software update to other access control devices in its proximity that also require the update (step 618). In this manner, other connected devices can receive and install the required software updates (step 620).

According to embodiments of the invention, this data transfer would take place in a way that is completely transparent to the user, with update packets being embedded in the handshakes already required for entering the building or performing other functions. Through this mechanism update packets would be handled appropriately throughout the entirety of the mesh network, with all access control and other system elements being updated through the network connection provided by any user's device interacting with any other part of the system.

Referring to FIG. 1A, a user mobile device 108 can communicate with access control device 102 for access control or other purposes. Access control device 102 can validate the handshake and receive a secure update packet in the same handshake from a remote management server via the user's network connection. Access control device 102 can then pass that update to access control device 104 for distribution to another access control device 106 on the same mesh network. In this way, an interaction with any piece of the network can update the entire network. This functionality can be important for guest management, general operational efficiency, and also for preventing any issues associated with lost or missing authentication devices. According to aspects of the invention, a mobile device and an access control device can either be in a central/master mode or a peripheral/slave mode. A device in a central/master mode can send software updates to other devices in peripheral/slave mode within range. Once a device in peripheral/slave mode receives the software update, then it can switch to a central/master mode. The devices are able to switch between central and peripheral mode as necessary to receive and send updates.

The disclosed system can mitigate the negative impact that the theft or misplacement of a mobile device or other authenticator would have on the operation of the system. If an authenticating element is misplaced, a user can report the event to a central server, for example, through an internet interface, a cellular interface, or in-person. Once the central server receives the report, it can push a system update to the impacted network to modify or delete the access credentials afforded to the misplaced or stolen device. This update can be transmitted via the methods described above.

Figure 7:
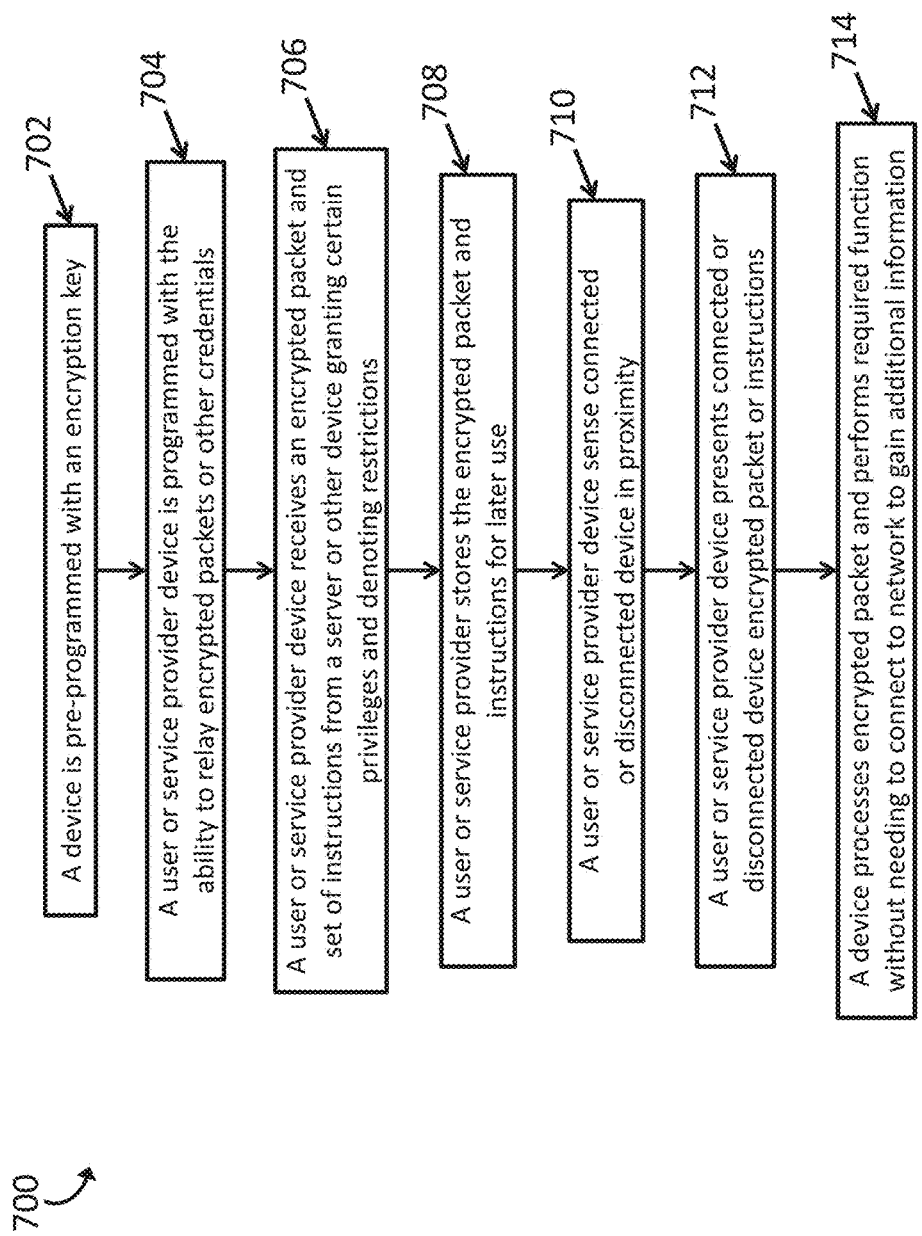
FIG. 7 illustrates an exemplary device communication encryption flow, according to embodiments of the present invention.

According to embodiments of the invention, the system allows encrypted communication between the system devices. FIG. 7 illustrates an exemplary device communication encryption flow for a device that can either be connected or disconnected to the mesh network. A connected or disconnected device can be pre-programmed with an encryption key (step 702). For example, an access control device can be programmed at the factory or at setup with security keys, which can be updated as necessary. A user or service provider mobile device can be programmed with the ability to relay encrypted packets or other credentials (step 704). Users or service providers can download an application that can be pre-programmed or updated with appropriate credentials. Then, a user or service provider mobile device can receive a credential, for example, an encrypted packet and set of instructions from a server, for example, server 152, or other device, granting certain privileges and denoting certain access restrictions (step 706). For example, the downloaded application can be updated via invitations to interact with other devices and can receive different capabilities based on the preferences of the user sharing the invitation. After the mobile device receives the encrypted packet, it can store the encrypted packet for later use (step 708), e.g., when the mobile device comes in contact with an associated connected device. The user or service provider device can sense a connected or disconnected device in proximity (step 710) and provide the encrypted packet or instructions (step 712). Then the device can process encrypted packet and can perform the required function without the need to connect to the network to gain additional information (step 714).

The disclosed system can also track the amenities and facilities utilization across a multi-unit building. Building managers can spend significant portions of their budgets on amenity spending to retain users. The disclosed system can quantify amenity usage across an entire building, groups of buildings, or an entire real estate portfolio through handshake tracking between users' devices and local systems. By positioning access control devices and other sensors within the larger envisioned system architecture, a complete record of building utilization can be generated. This information can be used to determine, for example, how many users in a particular building utilize the on-site gym facilities for purposes of assessing the relative value of that service or other such purposes that can be useful. Building managers can find this desirable in ascertaining how to retain current or attract new users, manage amenities, and spend their resources.

The complete record of building utilization can be facilitated by background handshaking with installed hardware throughout the building, with the user's activity remaining wholly uninterrupted by these background processes. Through the creation of this record, the system can detect if credentials are being used in a suspicious manner. For example, the system can detect that a particular user arrived and stayed at their unit, and then use this information to tag the attempted use of the user's credentials at one of the building's other access points. If this is determined to be suspicious, the system can alert the building manager. By directly tying access to the location of users within the multi-unit building, the system can overcome the security risks created by other systems that are reliant on non-traceable or non-associated access credentials. By tying authentication to a user's mobile device, it becomes far less likely that users will share their access privileges through any other means aside from those prescribed by the building management system. This tight connection between users and authentication devices creates a better audit trail for building managers.

The tracking information of building utilization can also have significant benefits for users of the building, as they would be able to view utilization data in real time to make decisions about when to use certain amenities. For example, a user can use their mobile device to access information from the local mesh network about how many people are using the on-site laundry facility at that given moment. This can enable the user to improve their amenity utilization experience by timing it such that they avoid wait times and other issues associated with over use of certain resources at certain times.

Figure 8:
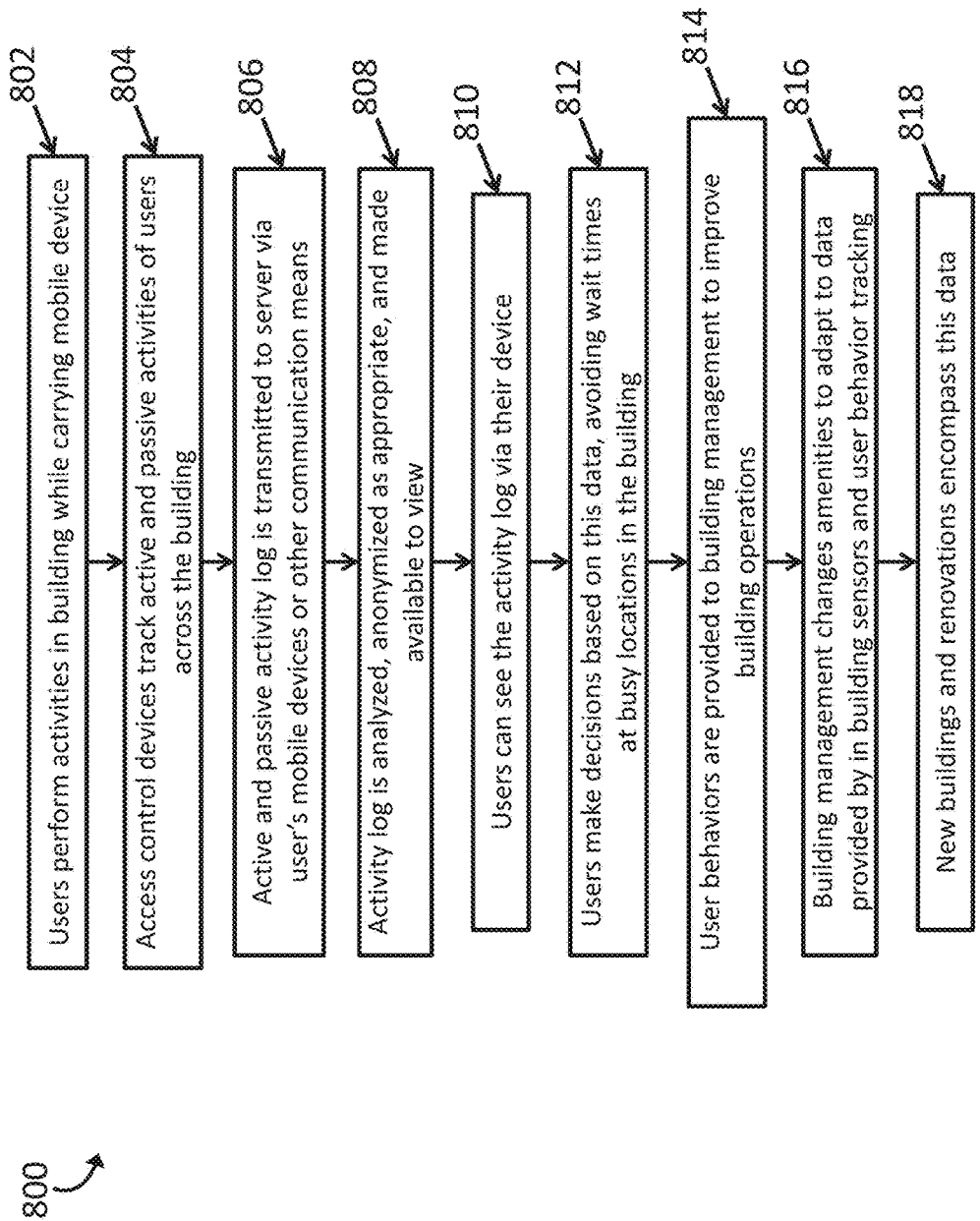
FIG. 8 illustrates exemplary method for tracking information of building utilization, according to embodiments of the present invention.

An exemplary method 800 of tracking information of building utilization is illustrated in FIG. 8. Users can perform their regular activities in the building, for example, visit the lounge area, the terrace, the gym, the laundry room, while carrying their mobile devices (step 802). The access control devices located throughout the building can track active and passive activities of users across the building (step 804). For example, an active activity can be accessing the laundry room. Passive activities can include, for example, the presence of five tenants in the gym area of a building, the presence of ten tenants on the roof deck of the building, or the presence of three tenants in the lobby of the building, who can be identified by the unique signature of their phone. The system can generate an active and passive activity log and can transmit the log to a server, for example, via a user's mobile device (step 806). The activity log can be analyzed, anonymized as appropriate, and made available to the building managers and the users (step 808). For example, the users can see the activity log on their mobile device (step 810). Based on the information, they can make appropriate decisions, for example, avoid wait times at busy locations in the building (step 812). In addition, user behavior can be provided to building management to improve building operations (step 814).

Building management can change amenities to adapt to the analyzed data (step 816). In addition, this information can be utilized when designing new buildings and or proposing renovations to existing buildings (step 818).

According to embodiments of the invention, the user can also set smart triggers to notify them about building events or to notify them about the user's guests behavior in the building. For example, a notification can be provided when a guest enters the building's front door, arrives at the individual unit door, or when they access other facilities within the building. These smart triggers can be activated within the envisioned platform or through incorporation with other services, for example the "if this then that" (IFTTT) protocol.

While many of these events, associated triggers, and actions can help users behave more efficiently or improve their quality of life, there are also security advantages provided by this type of system in relation to building wide notifications. In the event of a network service disruption, natural disaster, or other catastrophic event, the disclosed system can provide key functionality through the local mesh network by pushing updates to users' devices via the building's network. In the event of natural disasters, the disclosed system can also track the location of building occupants in real time for rescue purposes. By activating in-building access control devices and user devices' mesh network capacities, the local network can potentially search and locate building occupants by looking for their radio-frequency identifier. This capacity can allow rescue workers and building managers to ascertain if there are individuals left behind in a particular building and engage them through their devices.

The local network communications capacity of the system can also be leveraged to provide communications between tenants in the building without the need for a persistent network connection. This can provide many capacities to a building operator or user, such as local social networks, advertising, and promotional communications. For example, a user can receive a message from another user via the local network, allowing both parties to know that the other is co-located on premises. This localized network can extend an existing network's functionality and create new functionality over time.

Figure 9:
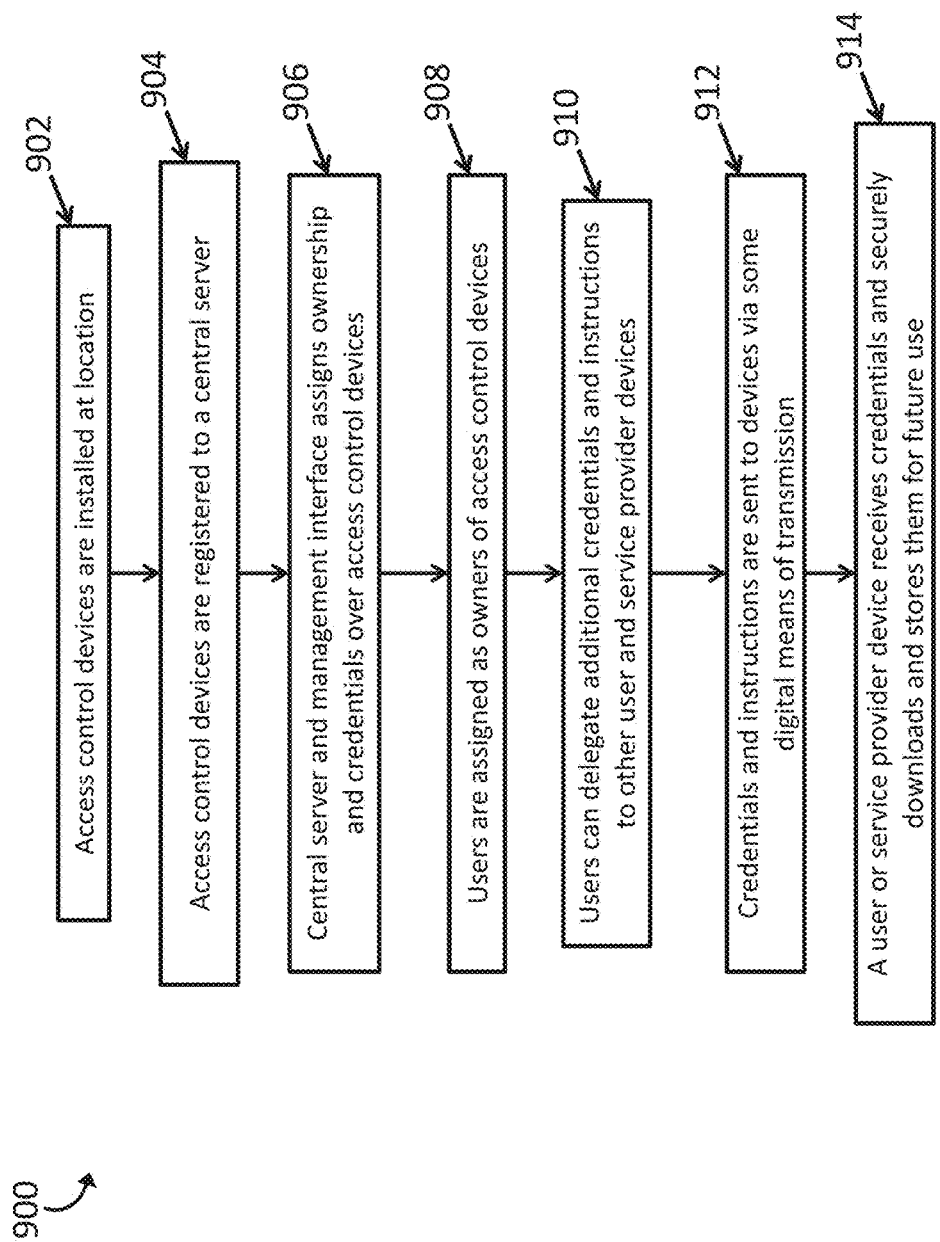
FIG. 9 illustrates an exemplary method for configuring an access control management system, according to embodiments of the present invention.

Persons skilled in the art would understand that the disclosed system can be installed in existing buildings, as well as new buildings. FIG. 9 illustrates an exemplary method for installing and configuring the disclosed system. Access control devices are first installed at one or more locations of the building (step 902) and are registered to a central server (step 904). Then, the central server can assign ownership and credentials over access control devices based on instructions from the building manager, for example, through a user interface (step 906). Subsequently, users can be assigned by the building manager as owners of the access control devices (step 908). Users can delegate credentials and instructions to their mobile devices and to other user and service provider devices (step 910). As discussed above, credentials and instructions can be sent to guest or service provider mobile devices via some digital means of transmission (step 912) and mobile devices can download and store the credentials for future use.

Figure 10:
FIGS. 10-12 illustrate exemplary screenshots of an application running on a mobile device for providing access control management, according to embodiments of the present invention.
Figure 11:
Figure 12:
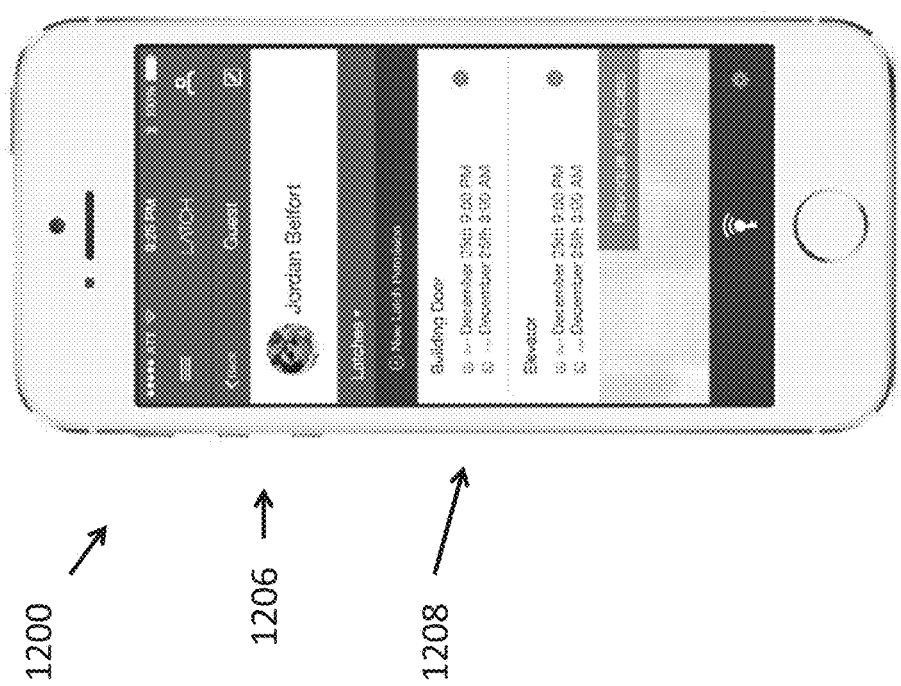

According to embodiments of the present invention, FIGS. 10-12 illustrate exemplary screenshots of an application running on a mobile device for providing access control management. Specifically, FIG. 10 shows exemplary screenshots 1002 and 1004 that can provide tracking information to the user of the mobile device. For example, screenshot 1002 provides access information 1008, for example, when the user accessed an access control device. In the particular example, the application can provide information relevant to the "Front Door," the "Gym," and the "Garage" access control points 1006. Screenshot 1004 provides, specific access information 1012 relevant only to the "Front Door" access control point.

FIG. 11 shows exemplary screenshots 1102 and 1104 that can provide information to the user of the mobile device about a scheduled event 1106. For example, screenshot 1102 can provide instructions 1108 about the date of the party, the access control devices that need to be accessed for the event, and the people invited to the event. Screenshot 1104 provides a list of the events associated with the user of the mobile device 1110 and a list of the invited guests.

FIG. 12 shows exemplary screenshot for granting by a user access to a guest. Screenshot 1200 is a screenshot of an application running on a user mobile device. The user can select a particular guest 1206 and can specify, using the app, particular access control devices and associated time windows 1208 for granting to the guest access to these access control devices. The application can request from the server to generate the appropriate credentials for the guest, and the server can send the credentials to the guest's mobile device.

Figure 13A:
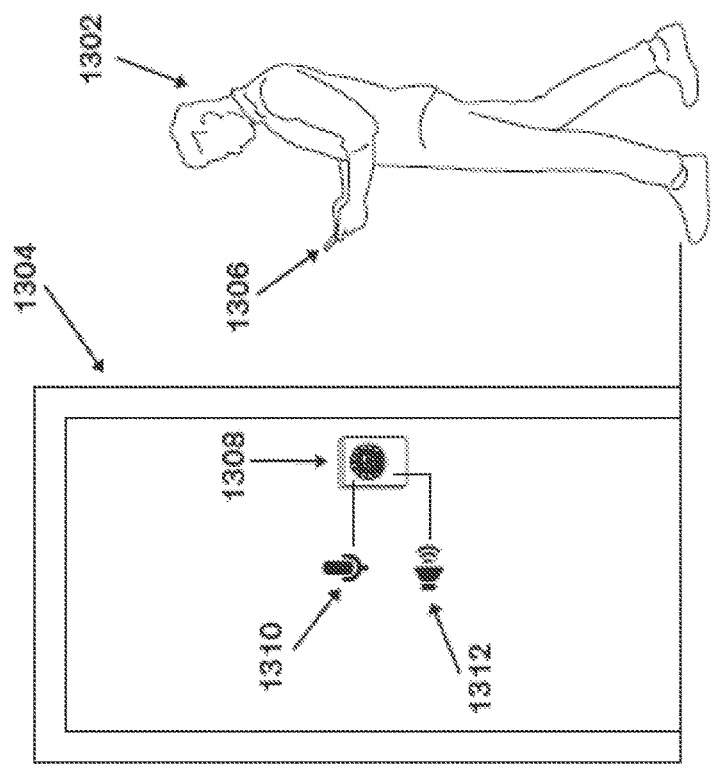
FIGS. 13A-13C illustrate an exemplary access control management system, according to embodiments of the present invention.
Figure 13B:
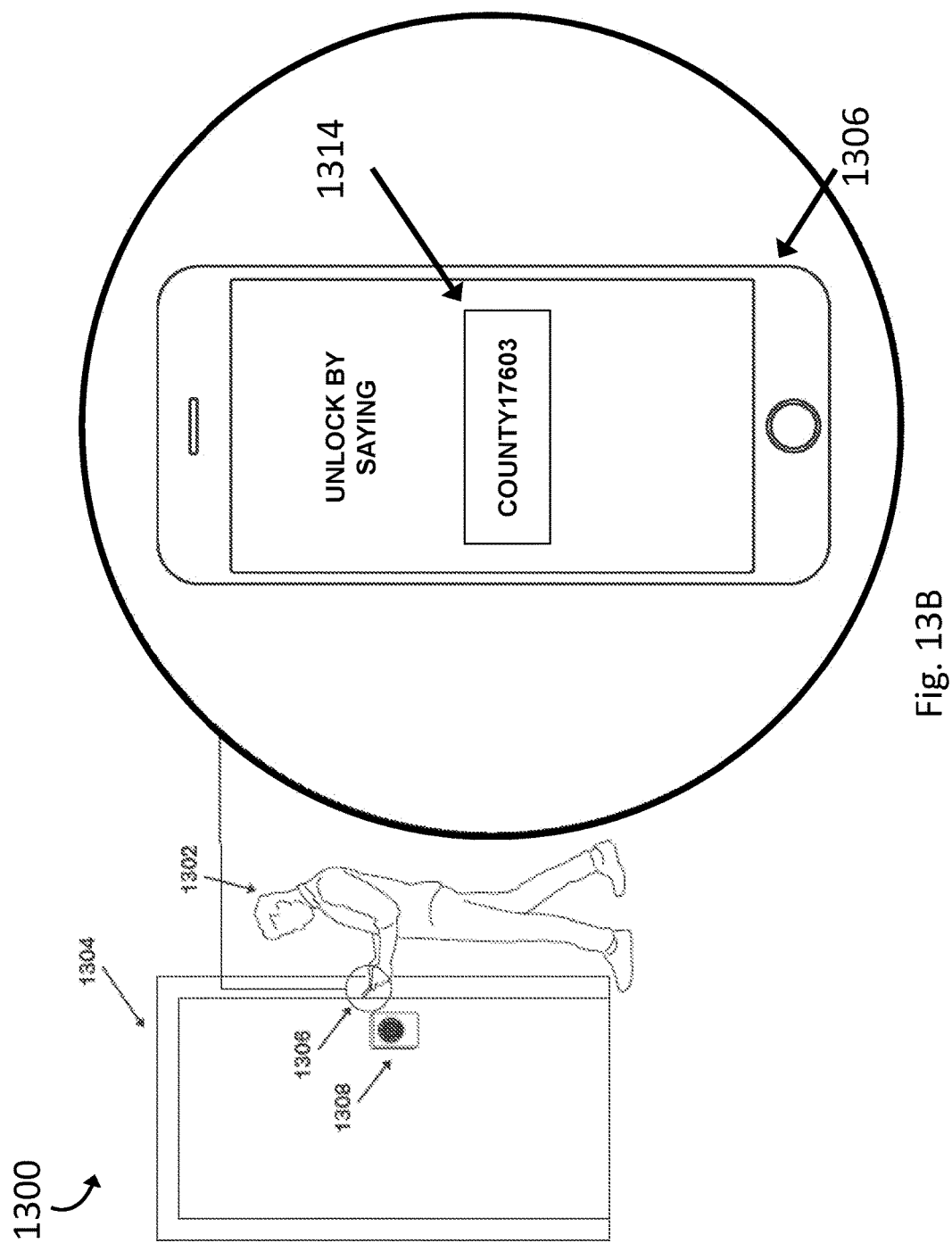
Figure 13C:
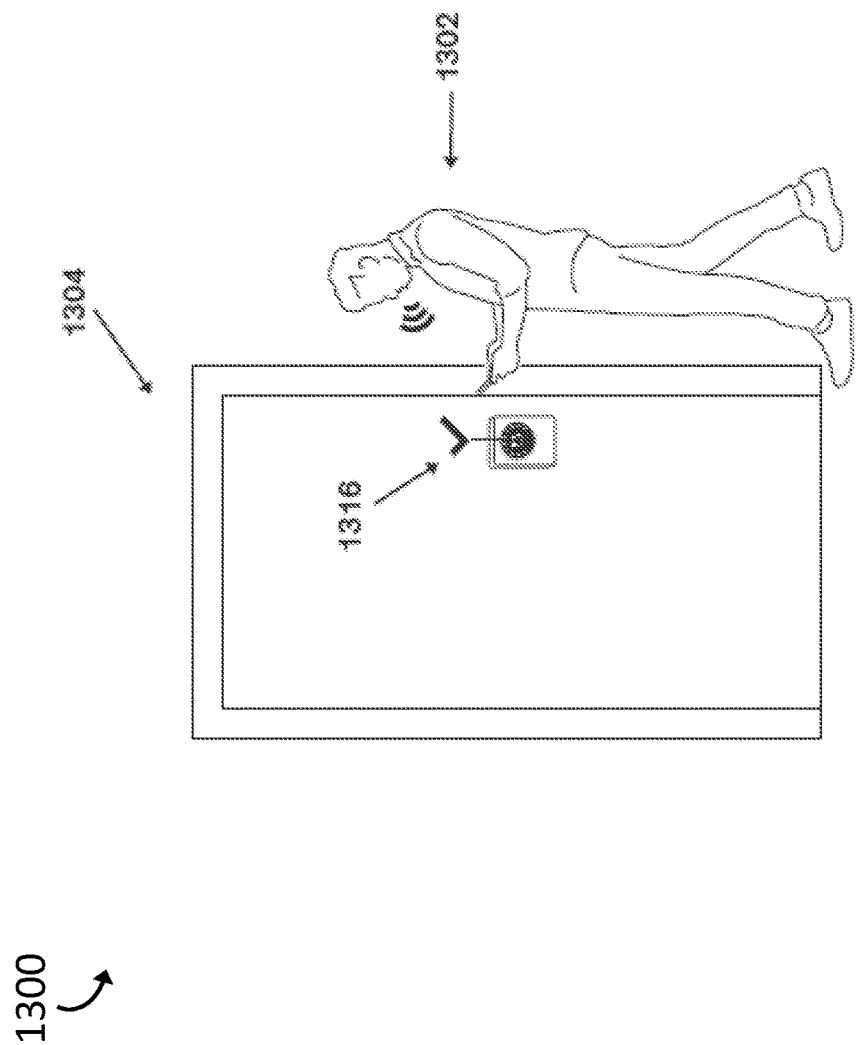

FIGS. 13A-13C show an exemplary system 1300 for voice-based authentication, according to embodiments of the present invention. Specifically, FIG. 13A shows user 1302 holding mobile device 1306 approaching door 1304. Door 1304 can be locked and/or unlocked through access control device 1308. Access control device 1308 can include a microphone 1310 and a speaker 1312. When user 1302 is in proximity of access control device 1308, as shown in FIG. 13B, access control device 1308 can sense mobile device 1306 and, in response, can generate a passcode that can be used to unlock door 1304, if the mobile device has credentials that provide permission to the area secured by door 1304. For example, access control device 1308 can generate a random numerical passcode or a verbal passcode. Once the passcode is generated, access control device 1308 can push the passcode to mobile device 1306. Mobile device 1306 can receive the passcode and can illustrate it in an application running on the mobile device 1306. Mobile device 1306 can also provide instructions to user 1302 to unlock door 1304. For example, mobile device 1306 can determine the type of the particular passcode received by access control device 1308, e.g., verbal or numerical passcode, and can appropriately instruct user 1302. As shown in FIG. 13B, an application running on mobile device 1306 instructs the user to "UNLOCK BY SAYING COUNTY17603" 1314. User 1302 can then speak the passcode (COUNTY17603), access control device 1308 can receive verbal input from user 1302, e.g., from microphone 1310, can process it, and determine whether it corresponds to the passcode it pushed to mobile device 1306. If the received verbal input corresponds to the generated passcode (1316), then access control device 1308 can unlock door 1304. Access control device can provide audio instructions or appropriate messages to user 1302, e.g., through speaker 1312, for example, when user 1302 provides a correct passcode (1316) or a wrong passcode. According to alternate embodiments, if the generated passcode is a numerical passcode, an application running on mobile device 1306 can provide a numerical keypad, where user 1302 can enter the passcode. Once the numerical passcode has been entered, mobile device 1306 can transmit a signal to access control device 1308, which in turn can determine whether the received signal corresponds to a correct passcode or not. According to alternate embodiments, if the generated passcode is a numerical passcode, user 1302 can enter the numerical passcode on access control device 1308.

According to embodiments, if the access control device determines that the received verbal input does not correspond to the passcode, the access control device can notify the user to speak the passcode another time. According to alternative embodiments, if the access control device determines that the received verbal input does not correspond to the passcode, the access control device can notify the user to enter the passcode using a numeric keypad of the access control device.

As discussed above, when a user with valid credentials approaches a facility where an access control device is installed, the access control device can authenticate the user. According to embodiments, in addition to granting access, the access control device can capture and store data relevant to the access, such as, temperature, time, date, visual data, audio data, motion data, and battery status data. The data can be stored locally on the access control device and can be later transmitted to various parties, e.g., a central system that can analyze access patterns and statistics. The data can be transmitted to a central system using, for example, a wireless connection with a nearby mobile device that is authorized to receive and transmit data from the access control device either passively or actively. Data transmission can also happen through a connection with another device within proximity of the access control device or through a direct network connection within the access control device.

Figure 14:
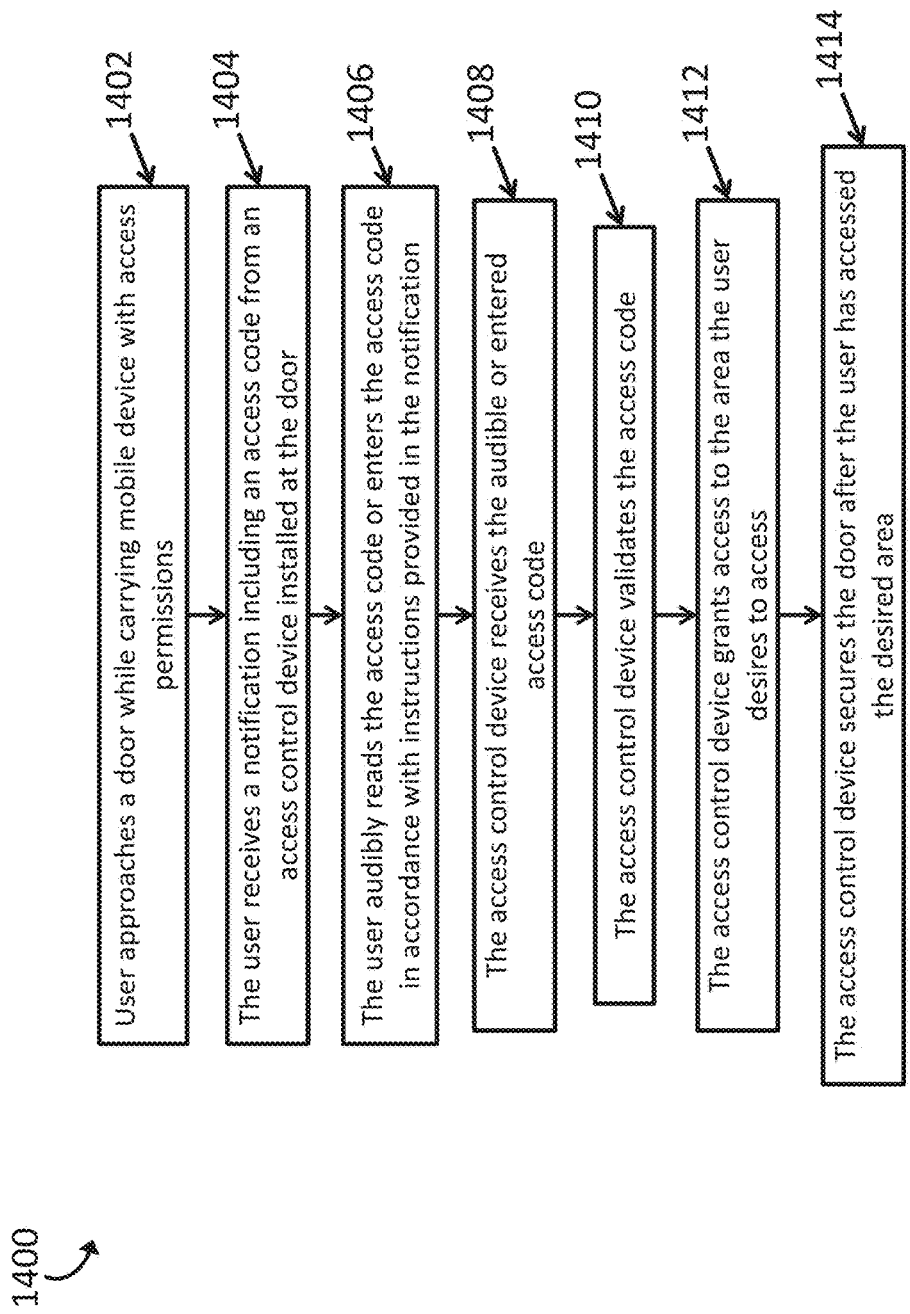
FIG. 14 illustrates an exemplary method for providing access to an area, according to embodiments of the present invention.

FIG. 14 illustrates an exemplary method for providing access to an area, according to embodiments of the present invention. For example, a user can approach a door with an access control device while carrying a mobile device that holds credentials that grant permission to the area behind the door 1402. When the user is in range of the access control device, the user can receive from the access control device, e.g., on the mobile device, a notification that includes an access code 1404. After the user receives the access code, the user can speak the access code or can enter the access code in accordance with the instructs provided in the notification 1406. The access control device can receive the access code 1408, can validate it 1410, and can grant access to the area secured by the door it is installed on 1412. After the user enters the area, the access control device can secure the door, e.g., by locking the door, 1414.

According to embodiments, the disclosed methods and systems can provide valuable features beyond capturing and storing access data. For example, people who manage facilities are interested in monitoring the utilization of their facilities and tracking behavior of users and/or tenants of the facilities. Monitoring the number of users or people that pass through a particular access point, e.g., a store or a common area, is valuable. Understanding how many people have passed through a particular access point, either securely through valid credentials or through an unsecured process, can be very helpful in assessing the utilization of a space and the relative demand for that space. For instance, a retailer can install the disclosed access control device and track the number of times per day that the access point is utilized as a data point related to sales volume, and, for example, to forecast a longer-term trend.

According to embodiments, the access control device can determine how many times the access point was activated, as well as, how many people passed through it, e.g., through one or more sensors and various algorithms. For instance, an access control device installed on a door can be programmed to detect every time the door is opened or closed. It can also be programmed to detect when a door has been opened and the number of subsequent persons that have entered through the door by detecting movement when the door is opened. Similarly, the disclosed access control device can detect when the door is opened and people are exiting through the door.

According to embodiments, the disclosed access control device can detect the presence of other users and their mobile devices. For example, the access control device can have a persistent Bluetooth or other wireless communication protocol broadcasting or receiving input from other mobile devices for the purposes of marketing and other notification generation. Specifically, the access control device can track mobile devices within range, log interactions with the mobile devices, and store, transmit, and/or utilize the information.

The detection of specific devices can also be linked to other data sources to discover more about the presence of particular devices and their users. According to embodiments, the access control device can capture data related with a user's online or other remote interaction with a product or service and then tie that information to the physical proximity of that user's device when they are within a space within range of the access control device. This can allow advertisers to link online or other remote interaction with a specific visit to a particular location, providing tailored notifications to users based on previously gathered data when they enter proximity or providing other notifications post entering proximity based on additional gathered data.

All of the described various ways of detecting access and awareness of users and devices can be valuable for tracking the ways in which users and devices are interacting with specifically designated spaces in a building. One example use case for such an access control device is to manage deliveries to a specific space, e.g., a storage room, at a building. This specific space could be monitored by the access control device, which can regulate the access and limit the access to authorized users only, with their activities within that space tracked, stored, and utilized for future use.

Similarly, the access control device can monitor the utilization of specific spaces in buildings for purposes of assessing the usage of these areas. This usage data can be used to dynamically price access to a particular area based on demand for that space of amenities within the space. By capturing and comparing this data, predictive models of space utilization can be created to optimize operations and performance of the space and also influence the design of future buildings to account for the appropriate resources in a given space to best maximize the monetization and functional possibilities of a space. These capabilities can allow owners of such a system to quantify and measure the performance of various marketing campaigns and systems.

Figure 15A:
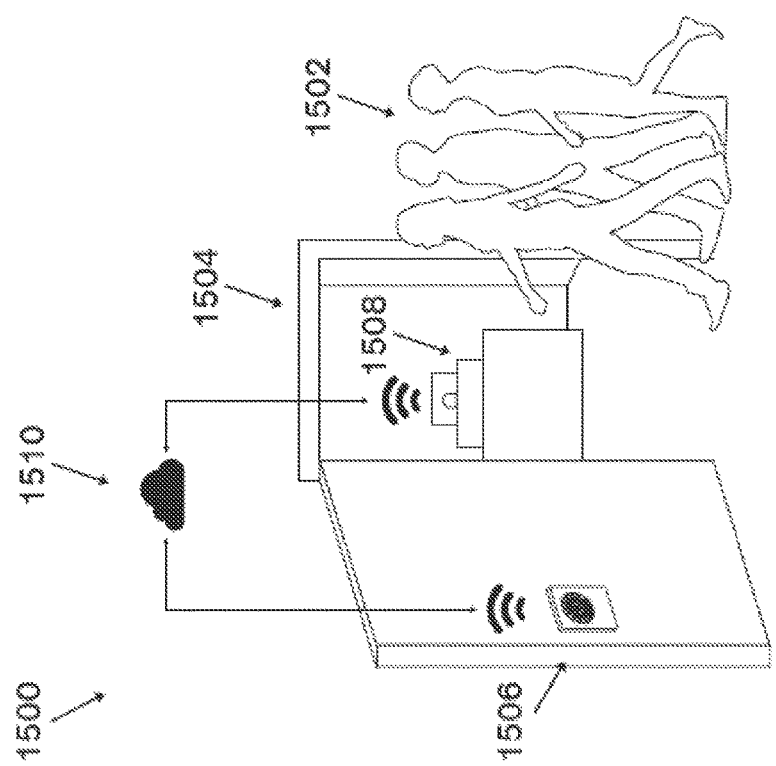
FIGS. 15A-15B illustrate an exemplary access control management system, according to embodiments of the present invention.
Figure 15B:
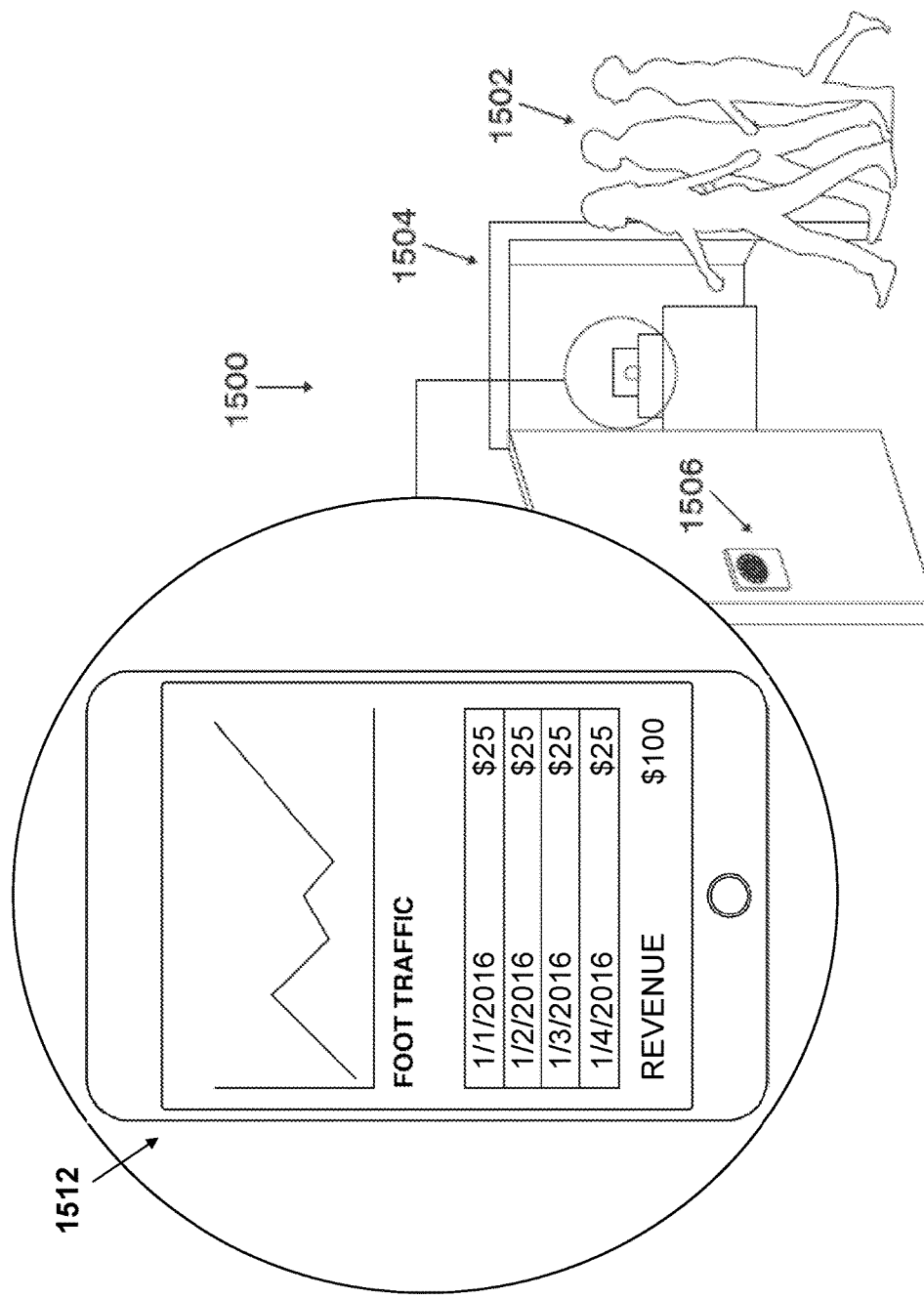

FIGS. 15A and 15B show an exemplary access control management system 1500, that can also provide "awareness" information, e.g., information about people accessing or using particular areas. Technologies that provide awareness information can include, cameras, proximity beacons, motion sensors, WiFi sensors, infrared (IR) sensors, audio sensors, visual sensors, accelerometers, position sensors, and other sensors that can detect a presences of one or more persons. For example, FIG. 15A shows one or more users 1502 entering an area secured by door 1504. Door 1504 has access control device 1506 that can communicate, e.g., wirelessly, with cloud service 1510. Access control device 1506 can detect the presence and/or identify of one or more of the users 1502 and can send information to cloud service 1510, e.g., information about the identified users. The area secured by door 1504 can be a retail shop that can have a counter with computing device 1508, e.g., a computer, a tablet device, a smartphone. Computing device 1508 can receive information from the access control device 1506 through cloud service 1510 or directly, e.g., through a local area network, where both control access device 1506 and computing device 1508 are connected to the same network, or a peer-to-peer network, e.g., Bluetooth. Computing device 1508 can use the received information to generate statistics 1512, e.g., foot traffic or revenue numbers, broken down by day, week, or other time periods.

Figure 16:
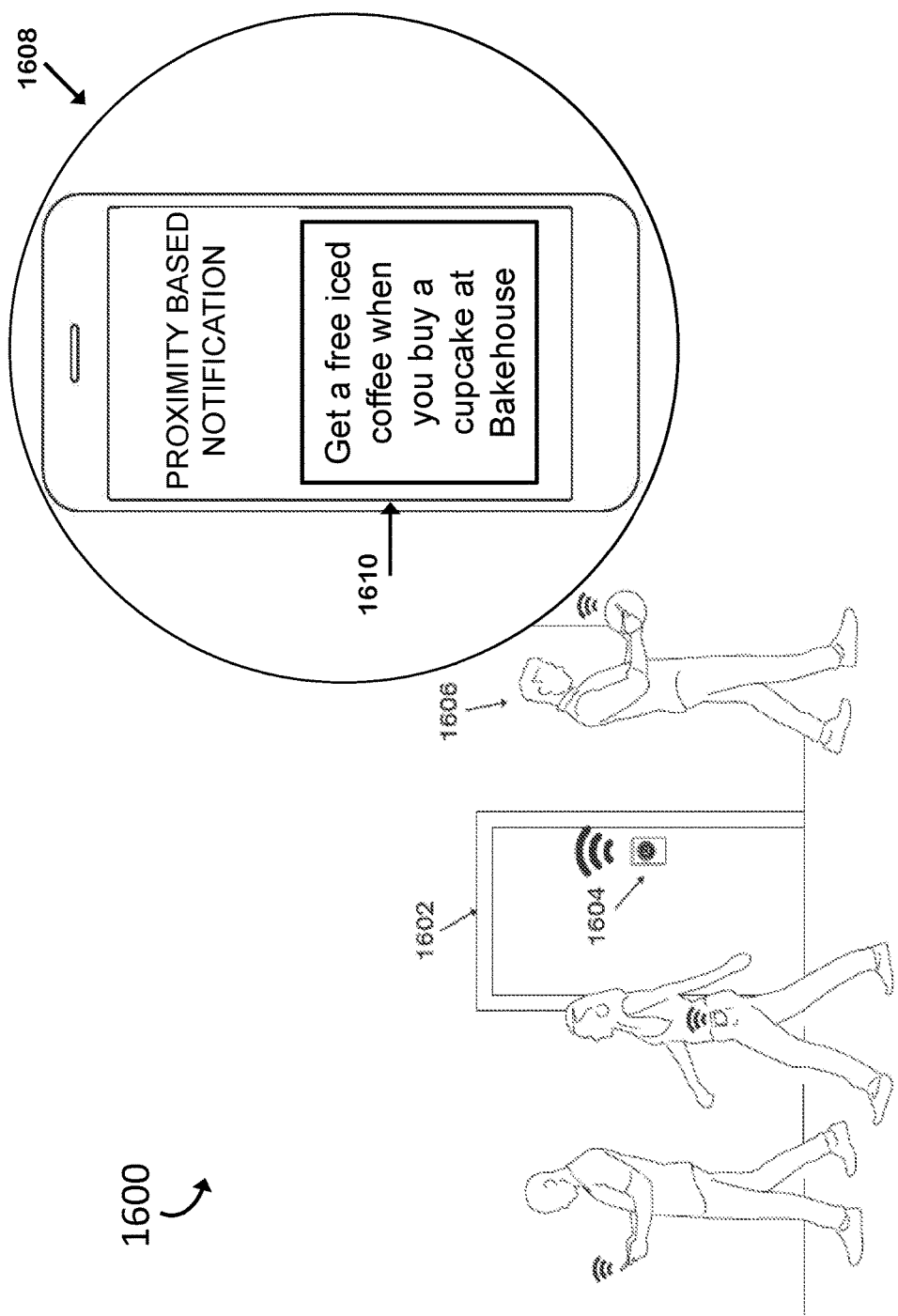
FIGS. 16-17 illustrate exemplary access control management systems, according to embodiments of the present invention.
Figure 17:
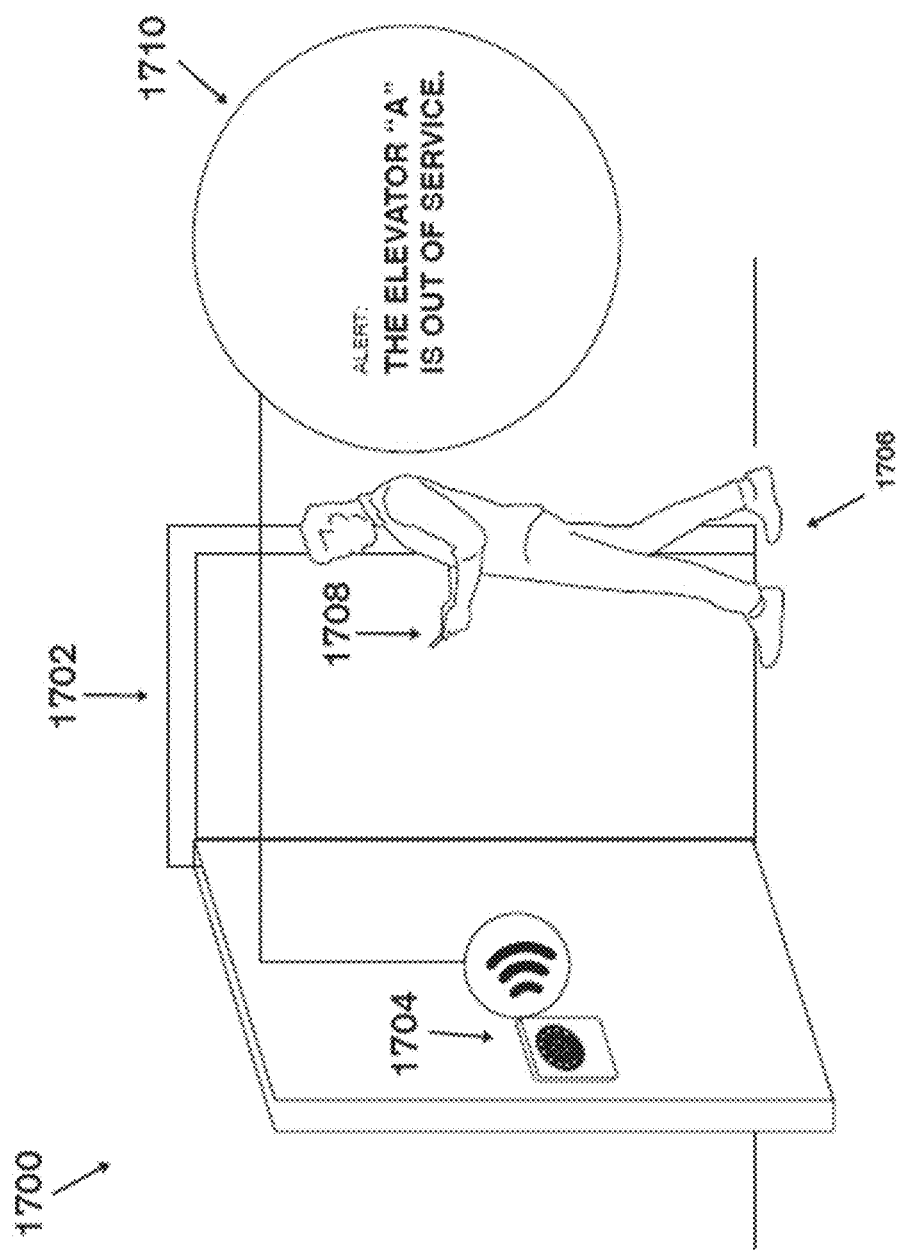

FIGS. 16 and 17 show exemplary access control management systems 1600 and 1700, respectively, that can also provide proximity based notifications. For example, FIG. 16 shows door 1602 with access control device 1604. Access control device 1604 can detect the presence of different users walking in its proximity, e.g., user 1606. For example, access control device 1604 can identify mobile device 1608, e.g., through installed credentials in the mobile device, and can determine to send notifications 1610 to the mobile device, e.g., advertisements, announcements, or alerts. For example, notification 1610 ("Get a free iced coffee when you buy a cupcake at Bakehouse") can be shown in a text message, an email, or on mobile device's lock screen. The access control device can identify a particular user and send a targeted notification, for example, by identifying their registered mobile device (sensing the mobile device), or by recognizing that a user has used a particular access credential associated with their profile, e.g., the user has used a particular credential to enter a particular area, e.g., a credential that grants access, e.g., to a common area or a gym at a building. According to embodiments, the access control device can sense the presence of a particular user mobile device, e.g., through Bluetooth®, NFC®, Wi-Fi Direct®, etc. After a particular mobile device is identified, the control access device can respond, for example, with a notification on the screen of the access control device, a notification on a screen in communication with the access control device, such as an announcement screen, through a notification on the screen of the mobile device, through an SMS, an email, chat message, and/or other type of communication.

According to embodiments, the disclosed systems and methods can provide targeted advertisement notifications to users, for example, based on relevance to their particular interests, e.g., specified in a user profile, proximity, based on time of day (e.g., notification for lunch deals), time of year (e.g., holiday season), socioeconomic data, previous shopping history, previous internet browsing history, and user physical presence history. Notifications can relate to non-targeted advertisements, e.g., general advertisements about the building or another venue.

Similarly, FIG. 17 shows door 1702 with access control device 1704. Access control device 1704 can detect the presence of user 1706. For example, access control device 1704 can identify mobile device 1708, e.g., through installed credentials in the mobile device, and can determine to send alert 1710 to the mobile device, e.g., an alert related to maintenance in a building. For example, notification 1710

("THE ELEVATOR 'A' IS OUT OF SERVICE") can be shown in a text message, an email, or on mobile device's lock screen.

Figure 18:
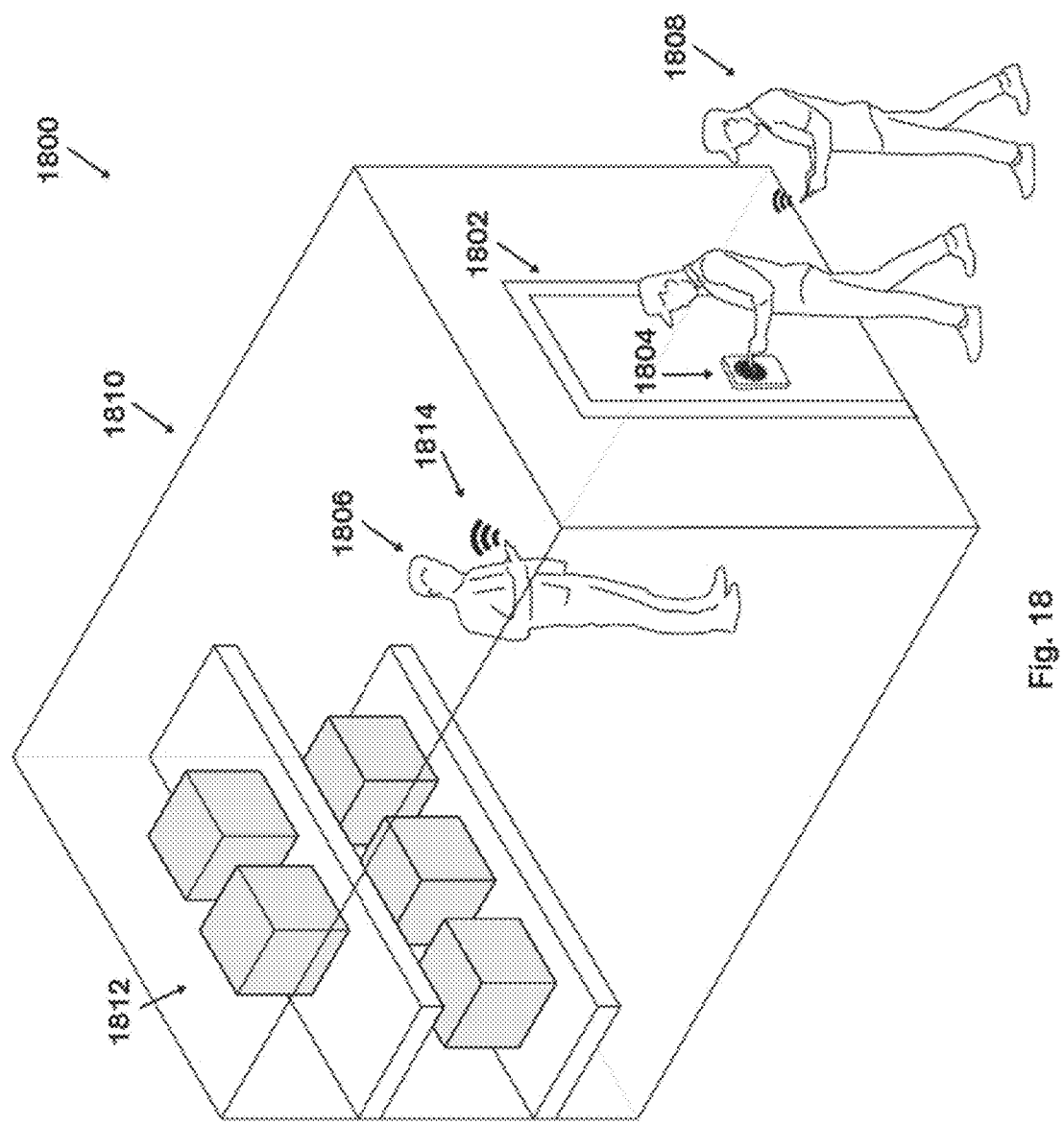
FIG. 18 illustrates an exemplary method for managing access to an area, according to embodiments of the present invention.

FIG. 18 shows an exemplary access control management system 1800. For example, door 1802 can provide access through access control device 1804 to a storage area 1810, e.g., a room to store packages 1812. User 1806 can be a manager for the package delivery and can provide credentials, e.g., through mobile device 1814, to a delivery crew 1808. For example, delivery crew 1808 can be scheduled to deliver or pick up a package to/from storage area 1810 during a particular time window. Mobile device 1810 of a member of delivery crew 1808 can receive the access credentials, e.g., a numeric passcode, which can be entered on a keypad of access control device 1804.

Figure 19:
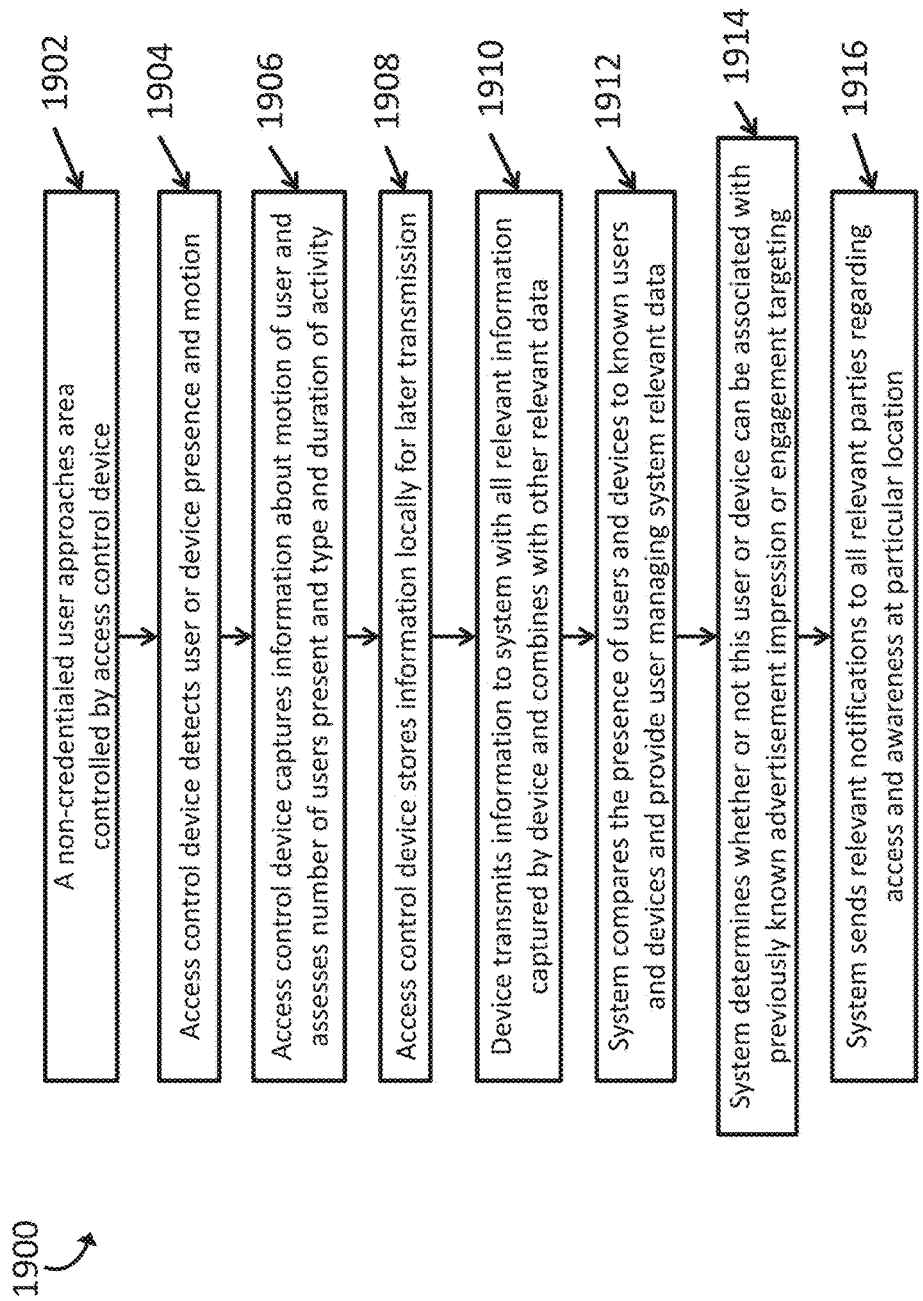
FIG. 19 illustrates an exemplary access and awareness control method, according to embodiments of the present invention.

FIG. 19 shows an exemplary method 1900 for access control and awareness using an access control device. For example, a non-credentialed user can approach an area that is controlled by an access control device (step 1902) or multiple access control devices. The access control device can detect the user or user device's presence and/or motion (step 1904). Based on the captured information, the access control device can assess the number of users present in the area, and the type or duration of their activity (step 1906). The access control device can optionally store the information locally, e.g., at a memory installed in the access control device, and can later send the store information to a central system for aggregate processing (step 1908). The access control device can transmit the information to a central system. The central system can combine the received information from one or more access control devices and can aggregate the data to generate statistics (step 1910). For example, the system can compare the presence of users (and their mobile devices) to known users (and mobile devices) and can provide relevant data to the system (step 1912). Based on the data, the system can determine whether the user or device can be associated with a previously known advertisement impression or engagement targeting (step 1914). For example, the access control device can store historical information about users and their mobile device. Alternatively, the mobile devices can store information about the access control devices and then respond when a particular access control device is detected by the mobile device. The system can then send relevant notification to all relevant parties about access and awareness at a particular location (step 1916). The relevant parties can include, for example, service providers, such as Amazon®, Seamless®, delivery services, such as FedEx® or UPS®, building manages, security companies, insurance providers, and advertisers.

Although the disclosed subject matter has been described and illustrated in the foregoing exemplary embodiments, it is understood that the present invention has been made only by way of example, and that numerous changes in the details of implementation of the disclosed subject matter may be made without departing from the spirit and scope of the disclosed subject matter.

The invention claimed is:

1. A system for access control management comprising:
one or more access control device, each access control device including a sensor configured to collect area utilization information, and each access control device configured to communicate with a mobile device of a user in range of at least one access control device and with a server; and
a mesh network constructed by the one or more access control device configured to allow the mobile device to join the mesh network when the mobile device is within range of the at least one access control device based on credentials stored on the mobile device, the credentials configured to enable the mobile device to provide access to the user to one or more area.

2. The system of claim 1, wherein the area utilization information includes information about one or more individual in an area.

3. The system of claim 2, wherein each individual has a corresponding mobile device with credentials stored on the corresponding mobile device.

4. The system of claim 2, wherein each individual has a corresponding mobile device without credentials stored on the corresponding mobile device.

5. The system of claim 2, further comprising a computing device configured to receive the information about the one or more individual from the one or more access control device.

6. The system of claim 5, wherein the computing device is further configured to receive the information about the one or more individual via at least one of a cloud service, a local area network, and a peer-to-peer network.

7. The system of claim 5, wherein the computing device is further configured to generate statistics based on the received information about the one or more individual in the area.

8. The system of claim 2, wherein the information about the one or more individual includes at least one of a number of the one or more individual, a type of activity of the one or more individual, and a duration of activity of the one or more individual.

9. The system of claim 2, wherein the information about the one or more individual is sent to a third party.

10. The system of claim 9, wherein the third party is at least one of a service provider, a delivery service provider, a building manager, a security company, an insurance provider, and an advertiser.

11. The system of claim 2, wherein at least one access control device further configured to store historical information about the one or more individual.

12. The system of claim 1, wherein the sensor is at least one of a camera, a proximity beacon, a motion sensor, a WiFi sensor, an infrared (IR) sensor, an audio sensor, a visual sensor, an accelerometer, and a position sensor.

13. The system of claim 1, wherein the mesh network is further configured to form an internet connection via the mobile device.

14. The system of claim 1, wherein at least one access control device is further configured to receive a system update from the mobile device.

15. The system of claim 14, wherein the system update includes a provisioned key.

16. The system of claim 1, wherein the area utilization information includes building utilization information;
wherein at least one access control device is further configured to:
track the building utilization information; and
transmit the building utilization information to the server; and
wherein the server is configured to:
analyze the building utilization information; and
provide the analysis to a building manager.

17. The system of claim 16, wherein the building utilization information includes at least one of a number of users in an area, a number of users using an amenity, and a number of users using a facility.

18. The system of claim 16, wherein the analysis of the building utilization information is provided to the one or more user via one or more mobile device.

19. The system of claim 16, wherein the server is further configured to send an alert to the building manager when the analysis of the building utilization information indicates a suspicious activity.

20. The system of claim 16, wherein the analysis of the building utilization information provides data about a sales forecast, dynamic pricing access to an area, deciding whether to use an area, deciding whether to improve an area, designing a new building, improving building operation, and performing rescue.

21. The system of claim 16, wherein the server is further configured to enable the one or more user to set a trigger that notifies the one or more user about behavior of a guest of the one or more user, based on the analysis of the building utilization information.

22. The system of claim 1, further comprising:
an application programming interface (API) that enables the user to provision access to a service provider to an area controlled by at least one access control device.

23. The system of claim 1, wherein the user provides second credentials to a second mobile device of a second user, the second credentials configured to enable the second mobile device to provide access to the second user to the one or more area,
wherein the second credentials include at least one of a pre-programmed digital radio frequency credential, a Bluetooth based credential, a digital copy of a physical key, and an alphanumeric password.

24. The system of claim 23, wherein the second credentials are valid for a period that is set by the user.

25. The system of claim 1, wherein the one or more access control device is further configured to grant access to a first area to the user when the mobile device of the user is in proximity to an access control device providing access to the first area.

26. The system of claim 1, wherein the server is configured to generate second credentials for a second mobile device of a second user to access an access control device that is offline.

27. The system of claim 26, wherein the second credentials match a pre-installed key of the access control device.

28. The system of claim 27, wherein the pre-installed key either is pre-installed at a factory, or is stored during installation of the access control device, or is updated since the installation of the access control device.

29. The system of claim 1, wherein the at least one of the one or more access control device is further configured to switch between a master mode and a slave mode;
wherein the master mode enables the one of the one or more access control device to send a software update to another access control device; and
wherein the slave mode enables the one of the one or more access control device to receive the software update from another access control device.

30. The system of claim 29, wherein the at least one of the one or more access control device is further configured to switch to the master mode from the slave mode after the at least one of the one or more access control device receives the software update.

31. The system of claim of 1, wherein the one or more access control device is further configured to collect at least one of a temperature, a time, a date, visual data, audio data, motion data, and battery status data.

32. The system of claim 31, wherein data relevant to access is transmitted to the server configured to analyze at least one of an access pattern and statistic, based on the received data relevant to access.

33. The system of claim 1, wherein the one or more access control device is further configured to perform encrypted communication with the mobile device.

34. The system of claim 1, wherein the one or more access control device is further configured to:
identify the user based on the credentials stored on the mobile device of the user;
generate at least one of a targeted advertisement and non-targeted advertisement for the identified user; and
send the at least one of a targeted advertisement and non-targeted advertisement to the mobile device.

35. The system of claim 34, wherein the targeted advertisement is based on at least one of a particular interest, a particular interest stored in a user profile, proximity, a time of day, a time of year, socioeconomic data, previous shopping history, previous internet browsing history, and user physical presence history.

36. The system of claim 34, wherein the non-targeted advertisement is a general advertisement about a building or a different venue.

* * * * *